US010229398B2

(12) United States Patent
Sun et al.

(10) Patent No.: US 10,229,398 B2
(45) Date of Patent: Mar. 12, 2019

(54) JOB EXECUTING SYSTEM THAT USES ONLINE PAYMENT SERVICE TO PAY FOR CHARGE, AND JOB EXECUTING METHOD

(71) Applicant: Kyocera Document Solutions Inc., Osaka (JP)

(72) Inventors: Zhenyu Sun, Osaka (JP); Yumi Nakagoshi, Osaka (JP); Tatsuya Hiwatari, Osaka (JP); Yoshio Inoue, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/706,674

(22) Filed: Sep. 16, 2017

(65) Prior Publication Data

US 2018/0082270 A1 Mar. 22, 2018

(30) Foreign Application Priority Data

Sep. 16, 2016 (JP) ................................. 2016-181482
Sep. 16, 2016 (JP) ................................. 2016-181493
Sep. 16, 2016 (JP) ................................. 2016-181494

(51) Int. Cl.
*G06Q 20/32* (2012.01)
*G06Q 20/10* (2012.01)
(Continued)

(52) U.S. Cl.
CPC ......... *G06Q 20/108* (2013.01); *G06Q 20/145* (2013.01); *G06Q 20/18* (2013.01);
(Continued)

(58) Field of Classification Search
CPC .... G06Q 20/108; G06Q 20/28; G06Q 20/145; G07F 17/266
(Continued)

(56) References Cited

U.S. PATENT DOCUMENTS

2007/0046969 A1* 3/2007 Shinchi ................. G06F 3/1204
358/1.13
2009/0109462 A1* 4/2009 Hiruma ................. G06Q 30/04
358/1.13

(Continued)

FOREIGN PATENT DOCUMENTS

JP 2001-351167 A 12/2001

*Primary Examiner* — Claude J Brown
(74) *Attorney, Agent, or Firm* — HEA Law PLLC

(57) ABSTRACT

A job executing system includes an image forming apparatus, a user terminal, a computer, and a bank account management system. The online payment service transmits a payment completion notification of a charge and a payment code to the computer with the computer identifier made to correspond to the payment code in first payment code management information. When the computer receives the payment completion notification, the computer transmits the payment completion notification of the charge for the job with the job identifier made to correspond to the payment code in the second payment code management information to the image forming apparatus, the image forming apparatus having the image forming apparatus identifier made to correspond to the payment code in the second payment code management information. When the image forming apparatus receives the payment completion notification, the image forming apparatus executes the job with the job identifier.

10 Claims, 22 Drawing Sheets

(51) Int. Cl.
  *G07F 17/26*   (2006.01)
  *G06Q 20/14*   (2012.01)
  *G06Q 20/28*   (2012.01)
  *G06Q 20/18*   (2012.01)
  *G06Q 20/20*   (2012.01)

(52) U.S. Cl.
  CPC ............ *G06Q 20/20* (2013.01); *G06Q 20/28* (2013.01); *G07F 17/266* (2013.01)

(58) Field of Classification Search
  USPC ........................................................ 235/379
  See application file for complete search history.

(56) References Cited

U.S. PATENT DOCUMENTS

| | | | | |
|---|---|---|---|---|
| 2009/0316185 | A1* | 12/2009 | Imamura | G03G 21/02 358/1.15 |
| 2014/0129428 | A1* | 5/2014 | Tyler | G06Q 20/3226 705/39 |
| 2014/0263630 | A1* | 9/2014 | Richardson | G06Q 20/3276 235/381 |
| 2015/0248664 | A1* | 9/2015 | Makhdumi | G06Q 20/3274 235/380 |
| 2016/0155112 | A1* | 6/2016 | Phillips | G06K 19/06037 235/379 |
| 2017/0256007 | A1* | 9/2017 | Barman | G06Q 50/12 |

* cited by examiner

37c

| Image ID | Job ID |
|---|---|
| I M 0 0 1 | J B 0 0 1 |
| I M 0 0 2 | J B 0 0 2 |
| . | . |
| . | . |
| . | . |

| M F P I D | Administrator ID |
|-----------|------------------|
| M F 0 0 1 | M G 0 0 1        |
| M F 0 0 2 | M G 0 0 2        |
| .         | .                |
| .         | .                |
| .         | .                |

| Payment Code | MFPID | Job ID |
|---|---|---|
| CD001 | MF001 | JB001 |
| CD002 | MF002 | JB002 |
| . | . | . |
| . | . | . |
| . | . | . |

*FIG. 7*

| Payment Code | Administrator ID | Charge | Computer ID |
|---|---|---|---|
| CD001 | MG001 | ¥100 | CM001 |
| CD002 | MG002 | ¥250 | CM002 |
| . | . | . | . |
| . | . | . | . |
| . | . | . | . |

| Payment Code | MFPID | Job ID | Charge |
|---|---|---|---|
| CD001 | MF001 | JB001 | ¥300 |
| CD002 | MF002 | JB002 | ¥50 |
| . | . | . | . |
| . | . | . | . |
| . | . | . | . |

| Payment Code | Administrator ID | User ID | Charge | Computer ID |
|---|---|---|---|---|
| CD001 | MG001 | US001 | ¥100 | CM001 |
| CD002 | MG002 | US002 | ¥250 | CM002 |
| . | . | . | . | . |
| . | . | . | . | . |
| . | . | . | . | × |

*FIG. 18*

JOB EXECUTING SYSTEM THAT USES ONLINE PAYMENT SERVICE TO PAY FOR CHARGE, AND JOB EXECUTING METHOD

INCORPORATION BY REFERENCE

This application is based upon, and claims the benefit of priority from, corresponding Japanese Patent Application Nos. 2016-181482, 2016-181493, and 2016-181494, each filed in the Japan Patent Office on Sep. 16, 2016, the entire contents of which are incorporated herein by reference.

BACKGROUND

Unless otherwise indicated herein, the description in this section is not prior art to the claims in this application and is not admitted to be prior art by inclusion in this section.

To date, systems comprising a copier and a coin box that enables paying charges by cash, for making charge payments in real time by means of the coin box on execution of a copy job by the copier, have been known.

SUMMARY

A job executing system according to one aspect of the disclosure includes an image forming apparatus, a user terminal, a computer, and a bank account management system. The image forming apparatus includes a first display device and a storage device. The user terminal includes a second display device and an imaging device. The computer has image forming apparatus management information where an image forming apparatus identifier of the image forming apparatus is made to correspond to an administrator identifier of an administrator of the image forming apparatus. The online payment service has user bank account information of a user of the image forming apparatus and administrator account information of the administrator of the image forming apparatus. The bank account management system manages a bank account. The image forming apparatus: (1) obtains an attribute of a job executed by the user; and (2) transmits a request for a calculation of a charge including the attribute, the image forming apparatus identifier of the image forming apparatus, and a job identifier of the job to the computer. The computer: (1) calculates the charge for the job based on the attribute and a specific calculation criterion; and (2) transmits a request for a payment code of the charge including the administrator identifier and a computer identifier of the computer to the online payment service, the administrator identifier being made to correspond to the image forming apparatus identifier in the image forming apparatus management information. The online payment service: (1) transmits the created payment code to the computer; and (2) makes the payment code, the charge, the administrator identifier, and the computer identifier correspond to one another and stores the payment code, the charge, the administrator identifier, and the computer identifier as first payment code management information. The computer: (1) transmits a two-dimensional code as the created payment code to the image forming apparatus; and (2) makes the payment code, the image forming apparatus identifier, and the job identifier correspond to one another and stores the payment code, the image forming apparatus identifier, and the job identifier as second payment code management information. The image forming apparatus displays the transmitted two-dimensional code in the first display device. The user terminal: (1) reads the two-dimensional code displayed in the first display device by the imaging unit; and (2) transmits the payment code shown by the two-dimensional code and a user identifier of the user terminal to the online payment service. The online payment service transmits the charge made to correspond to the payment code in the first payment code management information and bank account information associated with the user identifier in the user bank account information to the user terminal. The user terminal: (1) displays a payment screen in the second display device for receiving authentication information based on the charge and the bank account information; and (2) transmits the authentication information to the online payment service. The online payment service: (1) debits the charge made to correspond to the payment code in the first payment code management information from the bank account associated with the user identifier in the user bank account information managed by the bank account management system only when the authentication information is correct; (2) transfers the charge to an account associated with the administrator identifier in the administrator account information made to correspond to the payment code in the first payment code management information; and (3) transmits a payment completion notification of the charge and the payment code to the computer with the computer identifier made to correspond to the payment code in the first payment code management information. When the computer receives the payment completion notification, the computer transmits the payment completion notification of the charge for the job with the job identifier made to correspond to the payment code in the second payment code management information to the image forming apparatus, the image forming apparatus having the image forming apparatus identifier made to correspond to the payment code in the second payment code management information. When the image forming apparatus receives the payment completion notification, the image forming apparatus executes the job with the job identifier.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4 illustrates a tabular diagram of image management information according to the first embodiment.

FIG. 6 illustrates a tabular diagram of MFP management information according to the first embodiment.

FIG. 7 illustrates a tabular diagram of payment code management information according to the first embodiment.

FIG. 9 illustrates a tabular diagram of the payment code management information according to the first embodiment.

FIG. 17 illustrates a tabular diagram of payment code management information according to the second embodiment.

FIG. 18 illustrates a tabular diagram of the payment code management information according to the second embodiment.

DETAILED DESCRIPTION

Figure 1:
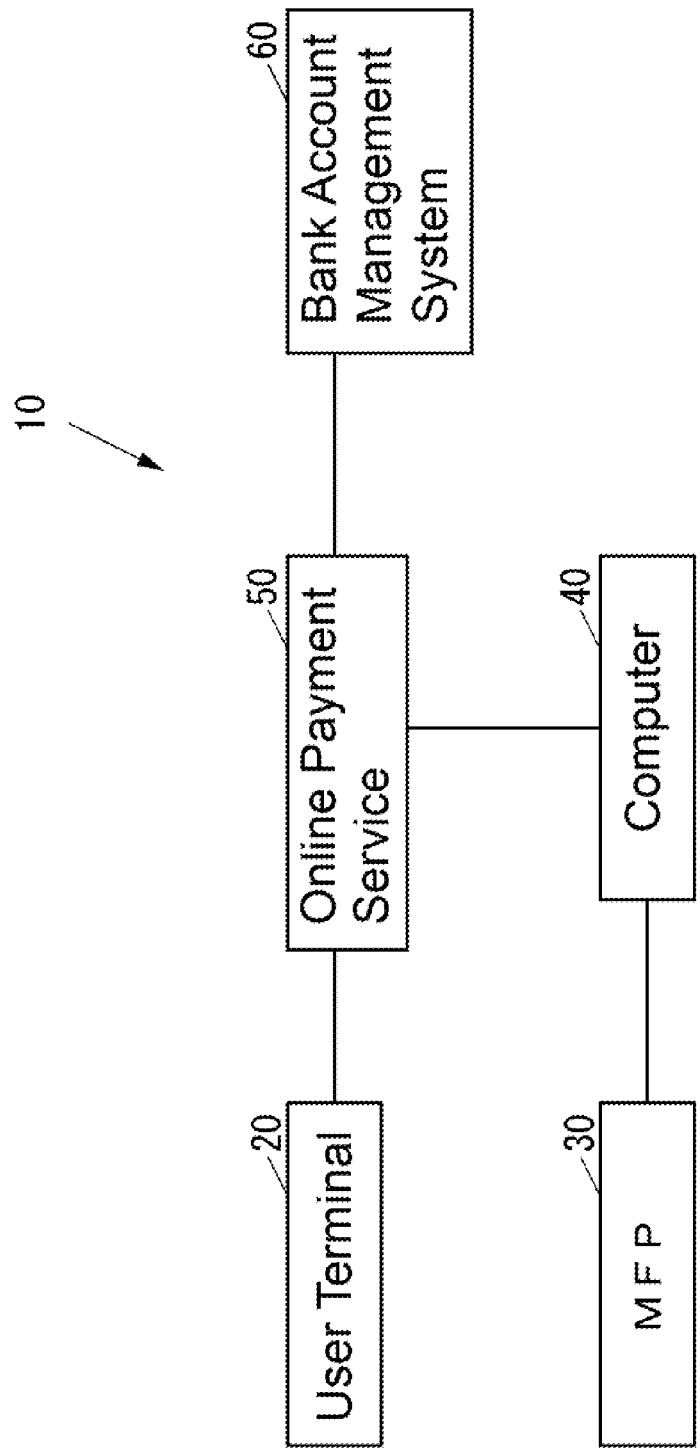
FIG. 1 illustrates a block diagram of a copy system according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

First Embodiment

The following describes a first embodiment of the disclosure with reference to the drawings.

First, the following describes a configuration of a copy system as a job executing system according to the first embodiment.

FIG. 1 illustrates a block diagram of a copy system 10 according to the first embodiment.

As illustrated in FIG. 1, the copy system 10 includes a user terminal 20 used by a user, a multifunction peripheral (an MFP) 30 as an image forming apparatus, a computer 40, an online payment service 50, which executes an online payment, and a bank account management system 60, which manages bank accounts.

The MFP 30 is installable at various facilities, for example, commercial facilities such as a convenience store and public facilities such as a university. The MFP 30 is a device that executes a copy, a function to print an image read from a document to a recording medium, according to a payment for a charge by a user. The MFP 30 can execute various kinds of copies such as an ID copy, which puts images on both surfaces of a document such as an ID card and a driver's license on which information is shown on both surfaces together on a single surface of one piece of recording medium without changing the sizes.

In addition to the process regarding the charge of the MFP 30, the computer 40 may be able to execute a process regarding a charge of at least one MFP similar to the MFP 30.

The respective online payment service 50 and bank account management system 60 are cloud services and are systems achieved by servers such as cloud servers.

The user terminal 20 and the online payment service 50 are communicable via a network such as the Internet.

The MFP 30 and the computer 40 are communicable via a network such as a local area network (LAN) and the Internet or directly communicable without via the network by wired or wireless communications.

The computer 40 and the online payment service 50 are communicable via the network such as the Internet.

The online payment service 50 and the bank account management system 60 are communicable via the network such as the Internet.

Figure 2:
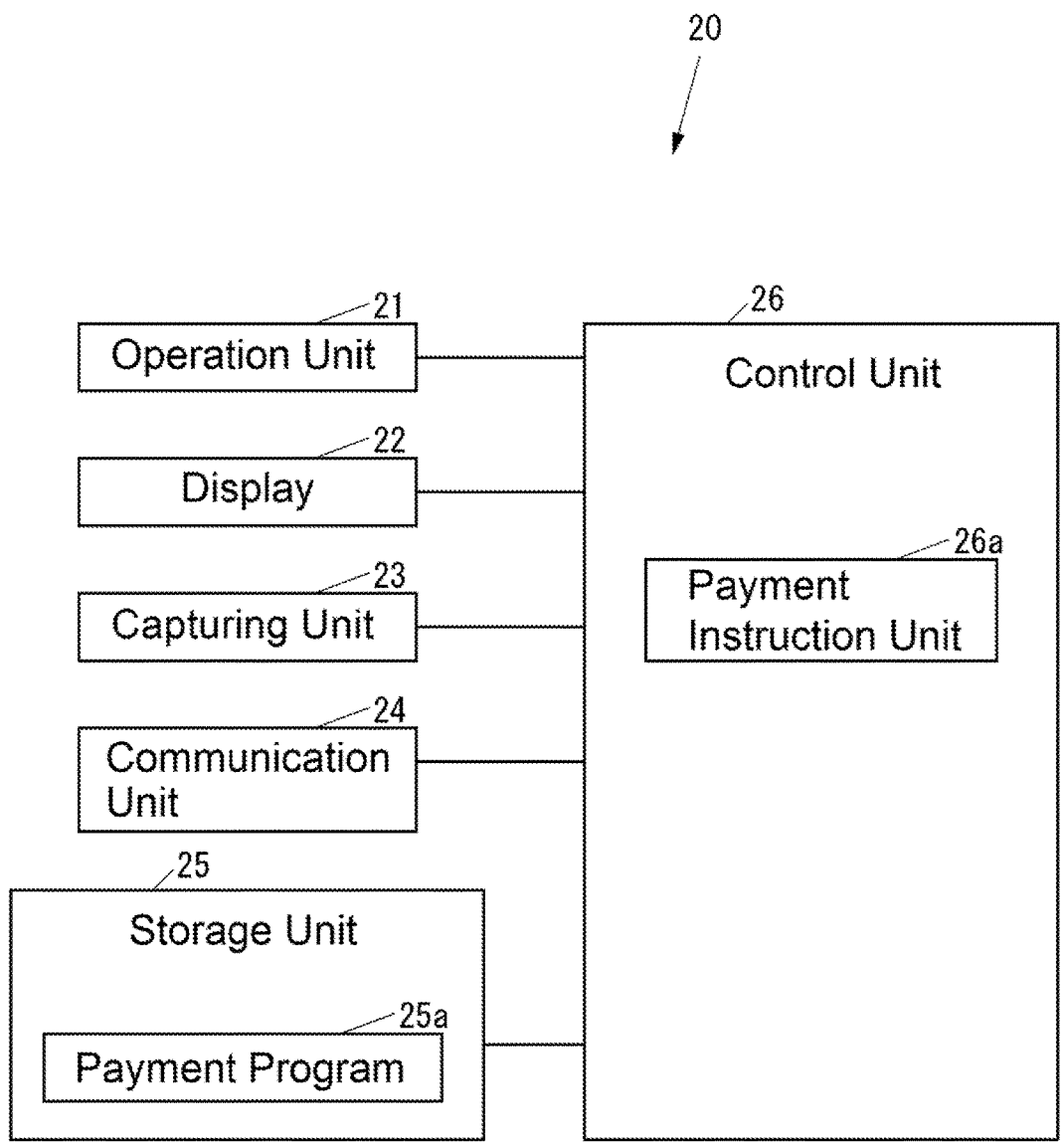
FIG. 2 illustrates a block diagram of a user terminal according to the first embodiment.

FIG. 2 illustrates a block diagram of the user terminal 20 according to the first embodiment.

As illustrated in FIG. 2, the user terminal 20 includes an operation unit 21, a display 22, a capturing unit 23, a communication unit 24, a storage unit 25, and a control unit 26. The operation unit 21 is an input device such as a button through which various operations are input. The display 22 is a display device such as a liquid crystal display (LCD) that displays various kinds of information. The capturing unit 23 is an imaging device such as a camera. The communication unit 24 is a communication device that executes communications with an external device via the network or directly without via the network by the wired or wireless communications. The storage unit 25 is a non-volatile storage device such as a semiconductor memory that stores various pieces of information. The control unit 26 controls the entire user terminal 20. The user terminal 20 may be a portable terminal such as a smart phone and a tablet.

The storage unit 25 stores a payment program 25a for payment by the online payment service 50 (see FIG. 1). The payment program 25a may be installed to the user terminal 20 at a production stage of the user terminal 20, may be additionally installed from an external storage medium such as a universal serial bus (USB) memory to the user terminal 20, or may be additionally installed from the network to the user terminal 20.

The control unit 26 includes, for example, a central processing unit (CPU), a read only memory (ROM) that stores programs and various data, and a random access memory (RAM) used as a work area of the CPU. The CPU executes the programs stored in the ROM or the storage unit 25.

The control unit 26 executes the payment program 25a to achieve a payment instruction unit 26a that instructs the online payment service 50 to execute the payment.

Figure 3:
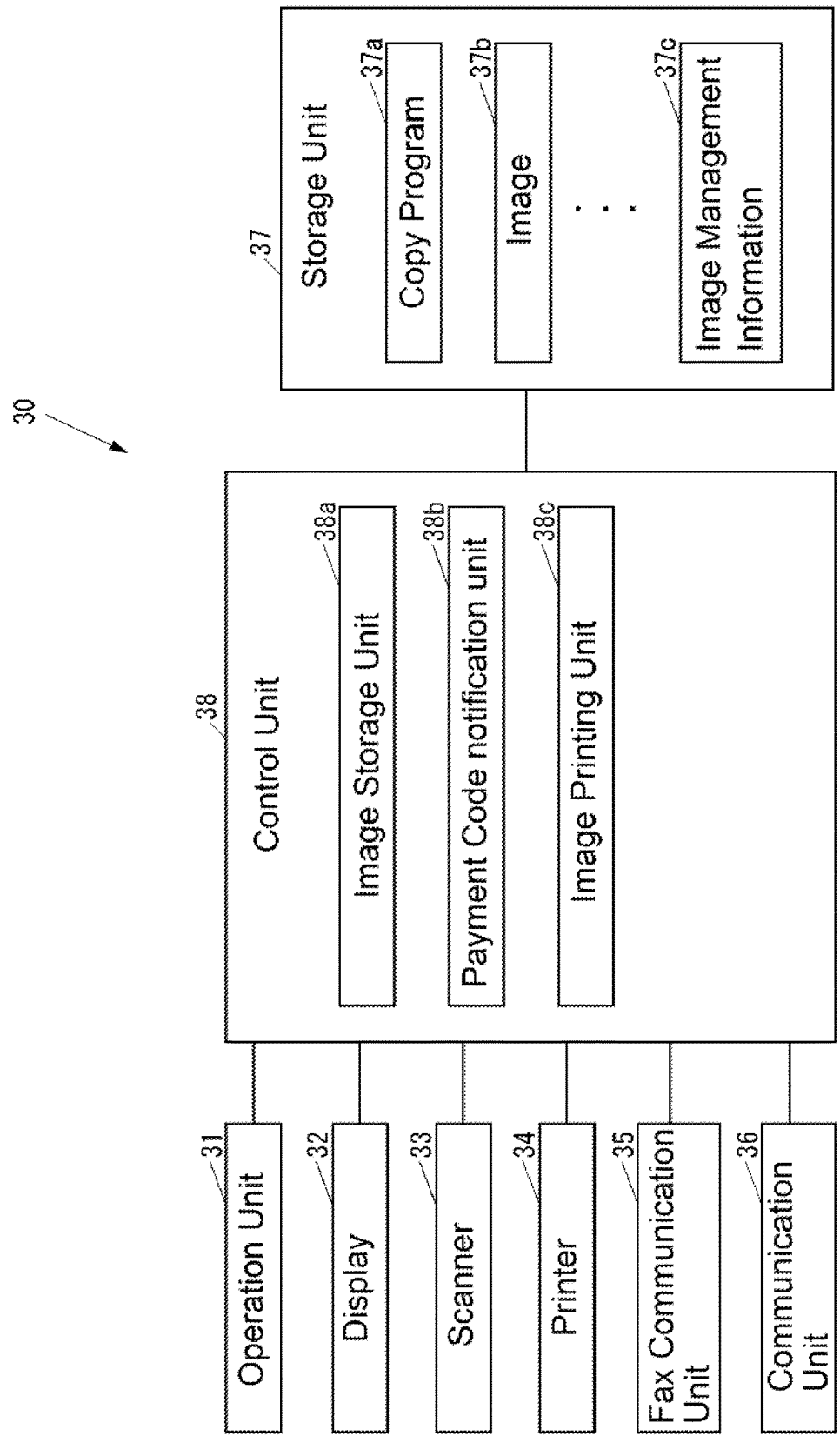
FIG. 3 illustrates a block diagram of an MFP according to the first embodiment.

FIG. 3 illustrates a block diagram of the MFP 30 according to the first embodiment.

As illustrated in FIG. 3, the MFP 30 includes an operation unit 31, a display 32, a scanner 33, a printer 34, a fax communication unit 35, a communication unit 36, a storage unit 37, and a control unit 38. The operation unit 31 is an input device such as a button through which various operations are input. The display 32 is a display device such as the LCD that displays various kinds of information. The scanner 33 is a reading device that reads an image from a document. The printer 34 is a print device that prints the image on the recording medium such as a paper sheet. The fax communication unit 35 is a fax device that executes fax communications with an external facsimile device (not illustrated) via a communication line such as a dial-up line. The communication unit 36 is a communication device that executes communications with the external device via the network or directly without via the network by the wired or wireless communications. The storage unit 37 is a non-volatile storage device such as the semiconductor memory and a hard disk drive (an HDD) that stores various pieces of information. The control unit 38 controls the entire MFP 30.

The scanner 33 includes an auto document feeder (an ADF) that can automatically read a plurality of pieces of documents and both surfaces of a document.

The storage unit 37 stores a copy program 37a as a job executing program to execute a job of "reading the image from the document by the scanner 33 and executing a specific process using this image." The copy program 37a is a program to execute a copy job of "reading the image from the document by the scanner 33 and printing this image by the printer 34." The copy program 37a may be installed to the MFP 30 at the production stage of the MFP 30, may be additionally installed from an external storage medium such as a USB flash drive to the MFP 30, or may be additionally installed from the network to the MFP 30.

The storage unit 37 can store a plurality of images 37b read from the document by the scanner 33.

The storage unit 37 can store image management information 37c to manage the image 37b.

Figure 4:
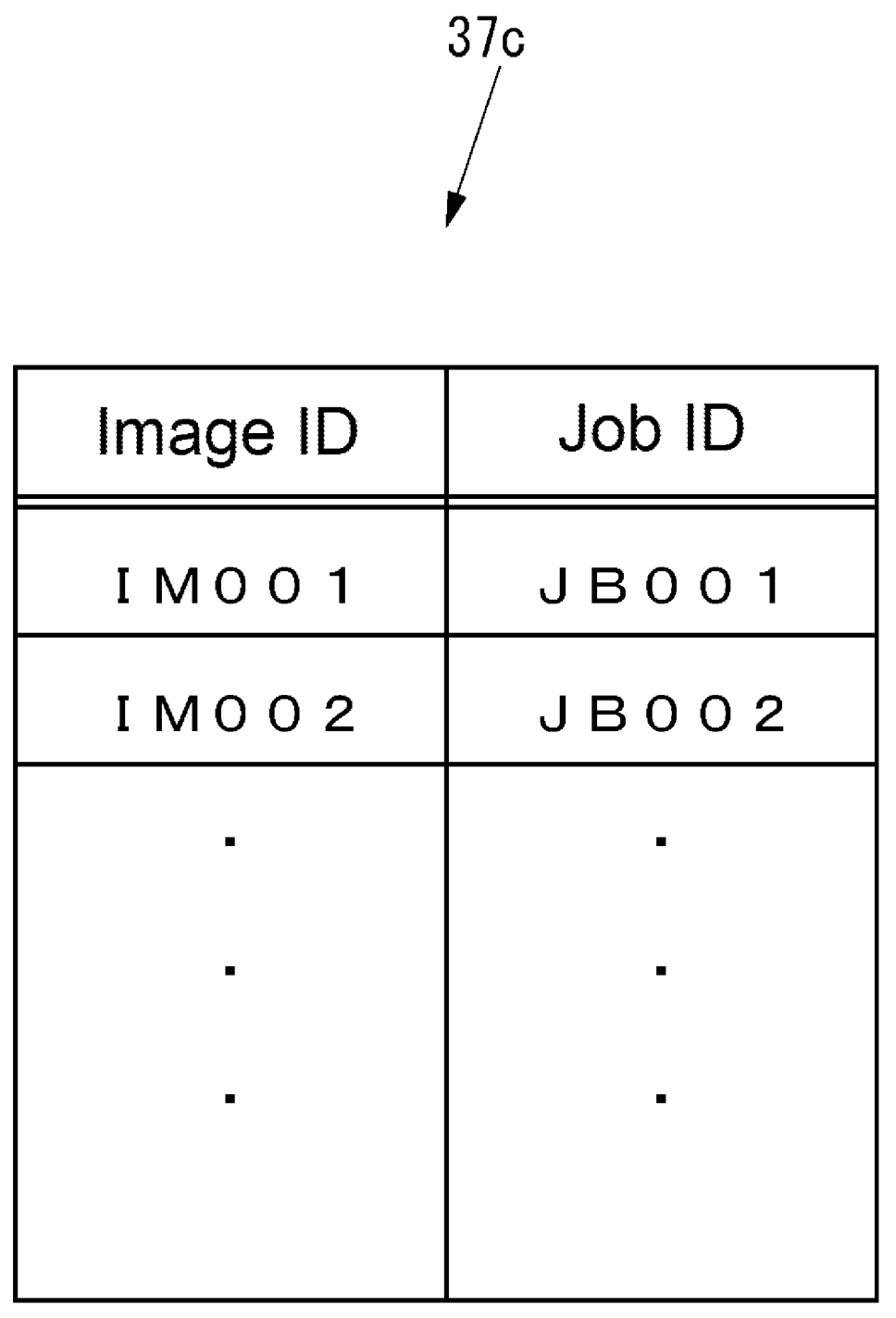

FIG. 4 illustrates one example of the image management information 37c according to the first embodiment.

As illustrated in FIG. 4, the image management information 37c is information where image IDs as identification information of the images 37b (see FIG. 3) are made to correspond to job IDs as identification information of the jobs.

The control unit 38 illustrated in FIG. 3 includes, for example, the CPU, the ROM that stores programs and various data, and the RAM used as the work area for the CPU. The CPU executes the programs stored in the ROM or the storage unit 37.

By executing the copy program 37a, the control unit 38 achieves an image storage unit 38a, a payment code notification unit 38b, and an image printing unit 38c as a specific process executing unit. The image storage unit 38a stores the image read from the document by the scanner 33 as the image 37b in the storage unit 37. The payment code notification unit 38b notifies a payment code issued for a charge calculated by the computer 40 (see FIG. 1) by the online payment service 50 (see FIG. 1). When the charge is paid via the online payment service 50 using the payment code notified by the payment code notification unit 38b, the image printing unit 38c prints the image 37b stored in the storage unit 37 to the recording medium by the printer 34.

The image storage unit 38a and the image printing unit 38c execute the copy job of "printing the image read from the document by the scanner 33 to the recording medium by the printer 34" in cooperation and configure a job execution unit of the disclosure.

Figure 5:
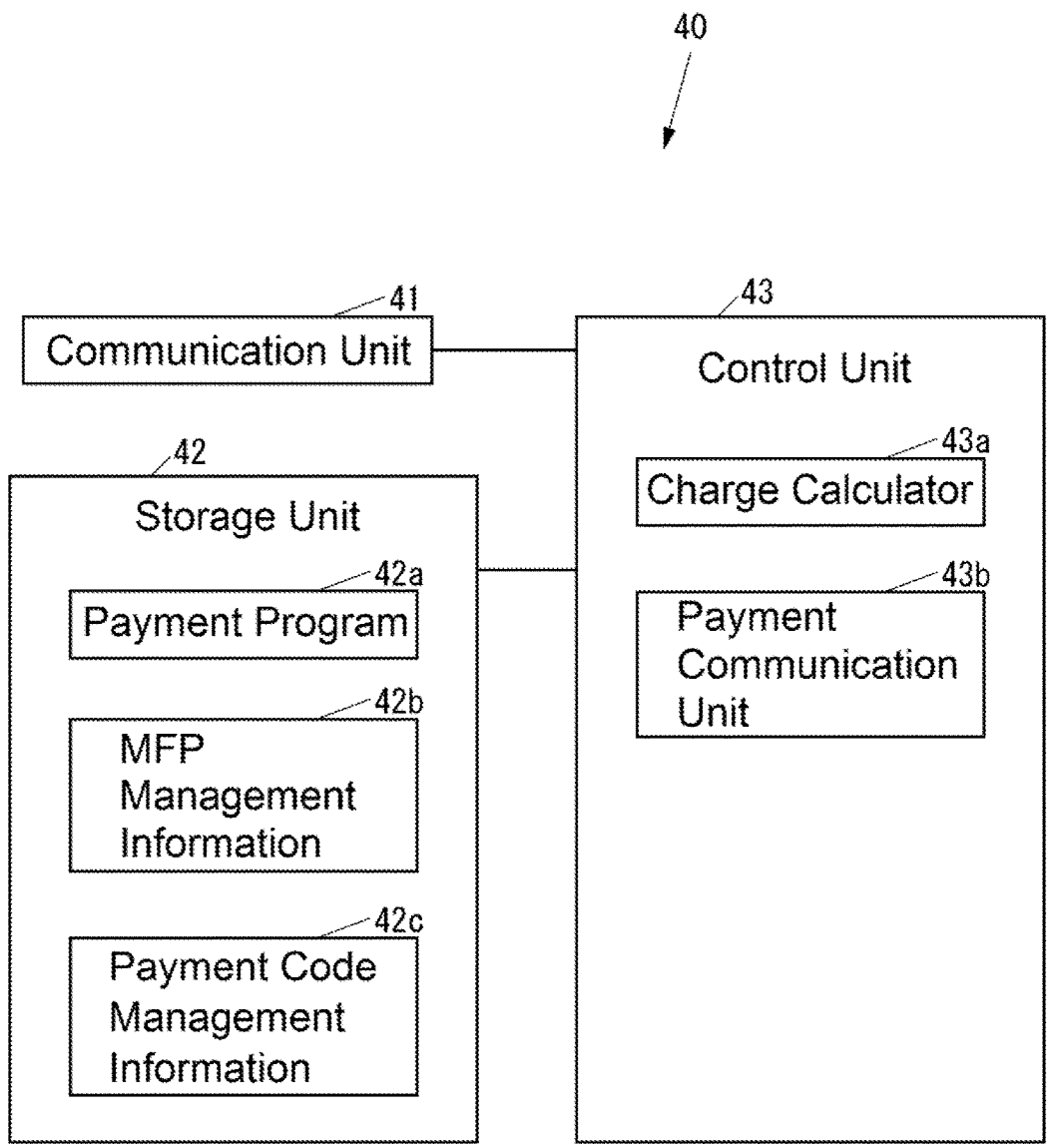
FIG. 5 illustrates a block diagram of a computer according to the first embodiment.

FIG. 5 illustrates a block diagram of the computer 40 according to the first embodiment.

As illustrated in FIG. 5, the computer 40 includes a communication unit 41, a storage unit 42, and a control unit 43. The communication unit 41 is a communication device that executes communications with the external device via the network or directly without via the network by the wired or wireless communications. The storage unit 42 is the non-volatile storage device such as the semiconductor memory that stores various pieces of information. The control unit 43 controls the entire computer 40.

The storage unit 42 stores a payment program 42a for payment by the online payment service 50 (see FIG. 1). The payment program 42a may be installed to the computer 40 at a production stage of the computer 40, may be additionally installed from an external storage medium such as the USB flash drive, a compact disk (a CD), and a digital versatile disk (a DVD) to the computer 40, or may be additionally installed from the network to the computer 40.

The storage unit 42 stores MFP management information 42b to manage the MFP.

FIG. 6 illustrates one example of the MFP management information 42b according to the first embodiment.

As illustrated in FIG. 6, the MFP management information 42b is information where MFP IDs such as a serial number as identification information of the MFP are made to correspond to administrators ID as identification information of an administrator of the MFP.

As illustrated in FIG. 5, the storage unit 42 can store payment code management information 42c to manage the payment code issued by the online payment service 50 (see FIG. 1).

FIG. 7 illustrates one example of the payment code management information 42c according to the first embodiment.

As illustrated in FIG. 7, the payment code management information 42c is information where the payment codes, the MFP IDs, and the job IDs are made to correspond to.

The control unit 43 illustrated in FIG. 5 includes, for example, the CPU, the ROM that stores programs and various data, and the RAM used as the work area for the CPU. The CPU executes the programs stored in the ROM or the storage unit 42.

By executing the payment program 42a, the control unit 43 achieves a charge calculator 43a and a payment communication unit 43b. The charge calculator 43a calculates the charge based on a reading result of the document by the scanner 33 (see FIG. 3). The payment communication unit 43b executes communications for the payment by the online payment service 50 (see FIG. 1).

Figure 8:
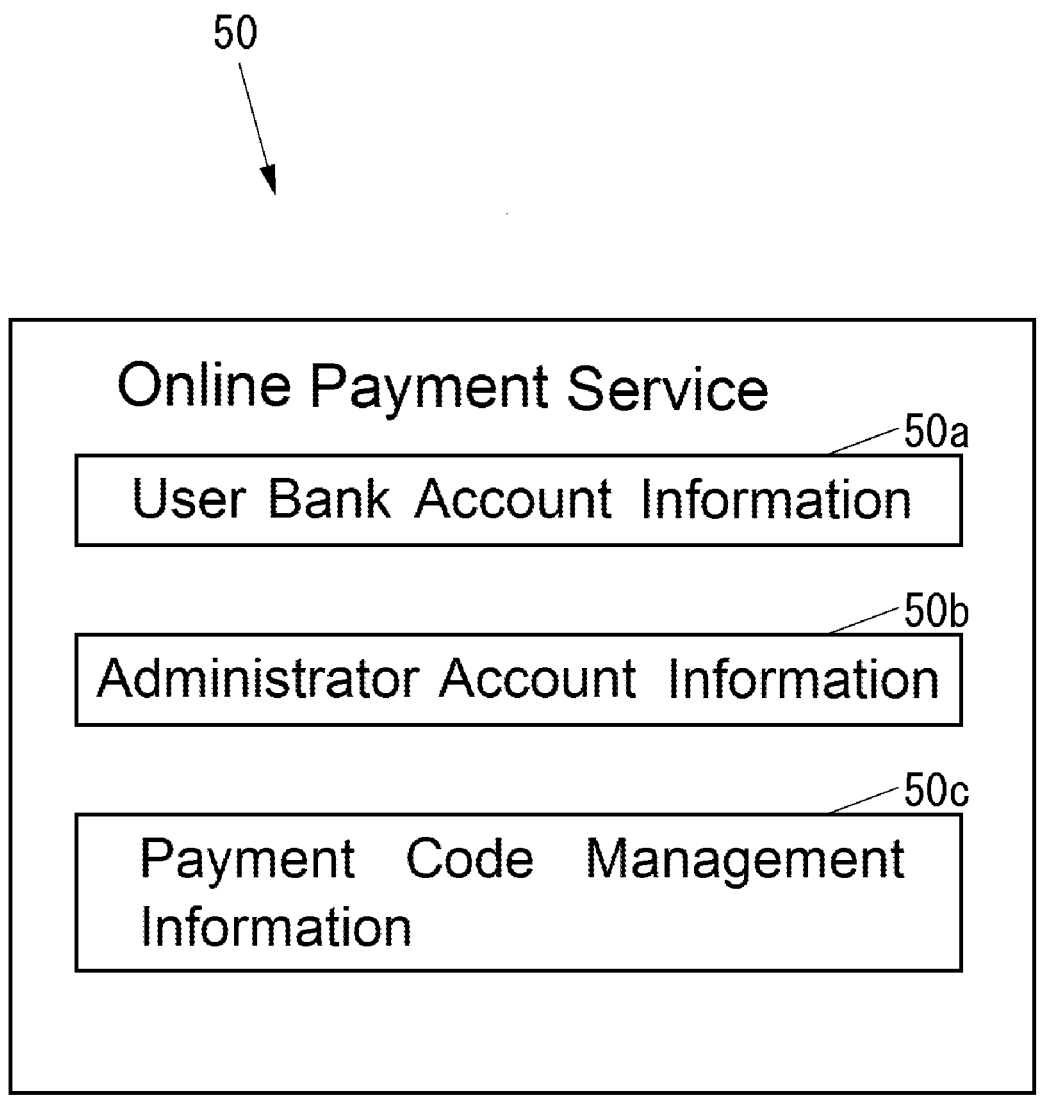
FIG. 8 illustrates a block diagram of information stored by an online payment service according to the first embodiment.

FIG. 8 illustrates one example of information stored by the online payment service 50 according to the first embodiment.

As illustrated in FIG. 8, the online payment service 50 stores user bank account information 50a and administrator account information 50b. The user bank account information 50a shows information on the bank account of the user for each user ID, the identification information of the user. The administrator account information 50b shows information on the account of the administrator of the MFP 30 for each administrator ID.

The user bank account information 50a includes information on the bank account of the user such as a name of the bank that manages the bank account of the user and the account number of the bank account. For example, the user can register the information on the bank account of the user with the user bank account information 50*a* in the online payment service 50 via the payment program 25*a* (see FIG. 2) via the operation unit 21 (see FIG. 2) of the user terminal 20 (see FIG. 2).

For example, the administrator can register the information on the account of the administrator with the administrator account information 50*b* in the online payment service 50 via the Internet via any Personal Computer (PC). The account of the administrator is the account managed by the online payment service 50, not the bank account.

The online payment service 50 can store payment code management information 50*c* to manage the payment code.

FIG. 9 illustrates one example of the payment code management information 50*c* according to the first embodiment.

As illustrated in FIG. 9, the payment code management information 50*c* is information where the payment codes, the administrator IDs, the charges, and computer IDs, identification information of the computer, are made to correspond to.

The following describes operations of the copy system 10.

First, the following describes the operations of the copy system 10 until the MFP 30 to which the copy instruction has been input displays a two-dimensional code.

Figure 10:
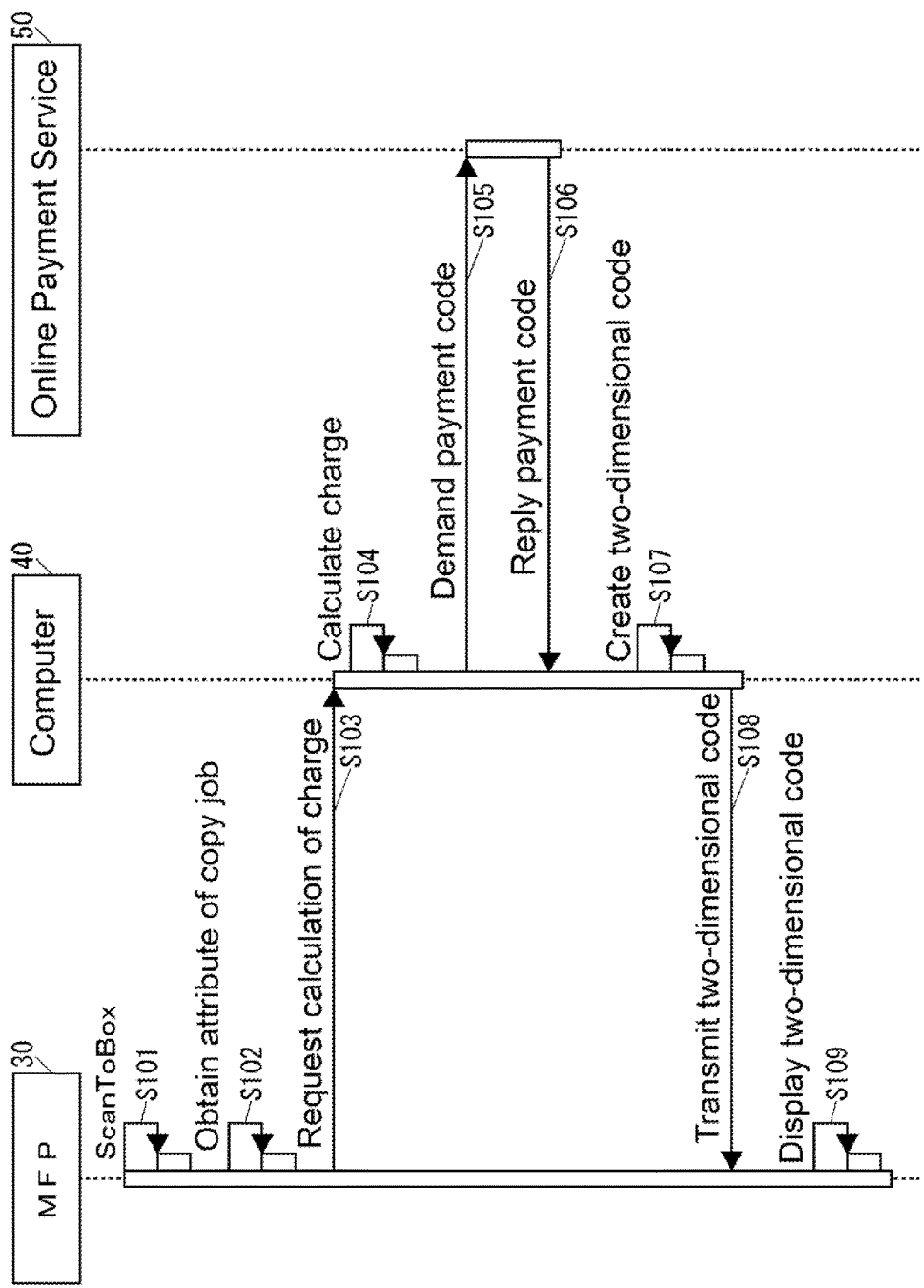
FIG. 10 illustrates a sequence diagram of a copy system according to the first embodiment until the MFP to which a copy instruction has been input displays a two-dimensional code.

FIG. 10 illustrates the operations of the copy system 10 until the MFP 30 to which the copy instruction has been input displays the two-dimensional code.

The user can input the copy instruction via the operation unit 31. As illustrated in FIG. 10, when the copy instruction is input via the operation unit 31, the image storage unit 38*a* in the MFP 30 executes an "operation of storing the image read from the document by the scanner 33 in a specific area in the storage unit 37" (hereinafter referred to as "ScanTo-Box") (Step S101). Here, the image storage unit 38*a* makes the image ID of the image stored at Step S101 correspond to the job ID of the job at this time and stores the data in the image management information 37*c*.

Figure 11:
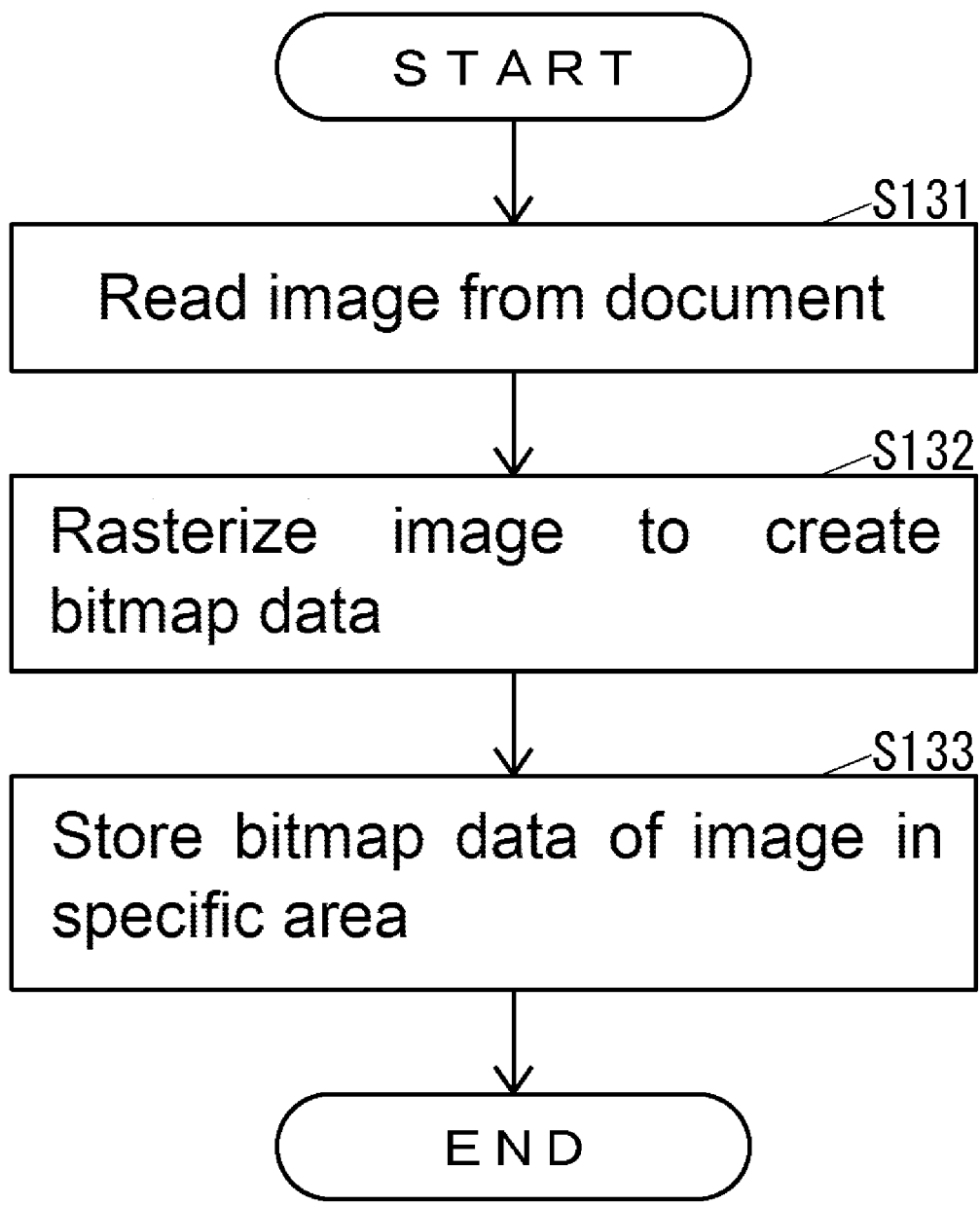
FIG. 11 illustrates a flowchart of the MFP according to the first embodiment when ScanToBox is executed.

FIG. 11 illustrates the operations of the MFP 30 according to the first embodiment when the ScanToBox is executed.

As illustrated in FIG. 11, the image storage unit 38*a* reads the image from the document by the scanner 33 (Step S131).

Next, the image storage unit 38*a* rasterizes the image read at Step S101 for printing by the printer 34, thus creating bitmap data (Step S132).

Finally, the image storage unit 38*a* stores the bitmap data created at Step S102 as the image 37*b* in the specific area in the storage unit 37 (Step S133).

As illustrated in FIG. 10, after the process at Step S101, the payment code notification unit 38*b* in the MFP 30 obtains an attribute of the copy job at this time (Step S102).

Here, the attribute of the copy job includes, for example, number-of-pages information indicative of the number of pages to be printed, double-side/single-side information indicative of whether to execute any of duplex printing and single-side printing, color information indicative of whether to execute any of a monochrome copy and a color copy, number-of-copies information indicative of the number of printed copies, and recording medium size information indicative of a size of the printed recording medium.

The number of pages is the number of printed surfaces. For example, one-sheet duplex printing means a printing by two pages.

With the identical numbers of pages, the charges may be set to be identical regardless of the execution of the duplex printing and the single-side printing. For example, the charges may be set to be identical in the case of the duplex printing on one sheet of recording medium and the case of the single-side printing on two sheets of recording medium.

Meanwhile, even with the identical numbers of pages, the charges may differ depending on whether any of the duplex printing and the single-side printing is executed. For example, the charge with the case of the duplex printing on one sheet of recording medium may be set lower than the charge with the case of the single-side printing on two sheets of recording mediums.

To determine the charge, the double-side/single-side information is used "when the charges differ depending on whether to execute any of the duplex printing and the single-side printing even with the identical numbers of pages."

The payment code notification unit 38*b* determines the number-of-pages information based on an actual reading result of the document by the scanner 33.

The payment code notification unit 38*b* determines the double-side/single-side information according to the setting of the copy instruction input via the operation unit 31. However, the payment code notification unit 38*b* may be set so as to change the double-side/single-side information based on the actual reading result of the document by the scanner 33. For example, even if a printing of a front surface and a back surface of the document on a front surface and a back surface of the recording medium, namely, the duplex printing, has been set by the copy instruction input via the operation unit 31, the payment code notification unit 38*b* may be set so as to change the printing to the single-side printing when none is printed on one surface of the document as a result of the actual reading of the document by the scanner 33.

The payment code notification unit 38*b* determines the color information according to the setting of the copy instruction input via the operation unit 31. However, the payment code notification unit 38*b* may determine or change the color information based on the actual reading result of the document by the scanner 33. For example, when the copy instruction input via the operation unit 31 is set so as to automatically determine the execution of any of the monochrome copy and the color copy, the payment code notification unit 38*b* determines the color information according to a color of the read document as a result of the actually reading of the document by the scanner 33. The payment code notification unit 38*b* may be set such that even if the color copy has been set by the copy instruction input via the operation unit 31, when the document is monochrome as a result of the actual reading of the document by the scanner 33, the document is treated for the monochrome copy.

The payment code notification unit 38*b* determines the number-of-copies information according to the setting by the copy instruction input via the operation unit 31.

The payment code notification unit 38*b* determines the recording medium size information according to the setting by the copy instruction input via the operation unit 31. However, the payment code notification unit 38*b* may determine the recording medium size information based on the actual reading result of the document by the scanner 33. For example, when "automatic" has been set as the size of the recording medium by the copy instruction input via the operation unit 31, the payment code notification unit 38*b* may automatically determine the appropriate recording medium size information according to the size of the read document as a result of the actual reading of the document by the scanner 33.

After the process at Step S102, the payment code notification unit 38b transmits a request for calculation of the charge based on the attribute obtained at Step S102 to the computer 40 (Step S103). Here, the payment code notification unit 38b transmits the MFP ID of the MFP 30 and the job ID of the job at this time together with the request at Step S103 to the computer 40.

When the charge calculator 43a in the computer 40 receives the request transmitted from the MFP 30 at Step S103, the charge calculator 43a calculates the charge for the copy job at this time based on the attribute transmitted from the MFP 30 together with this request, namely, the attribute obtained at Step S102, and specific calculation standard (Step S104).

Next, the payment communication unit 43b in the computer 40 demands the online payment service 50 for the payment code of the charge calculated at Step S104 (Step S105). Here, the payment communication unit 43b includes the administrator ID made to correspond to the MFP ID transmitted from the MFP 30 together with the request at Step S103 in the MFP management information 42b and the computer ID of the computer 40 in the request at Step S105.

Accordingly, the online payment service 50 issues the payment code according to the request at Step S105 and replies to the computer 40 (Step S106). The online payment service 50 makes the issued payment code correspond to the administrator ID, the charge, and the computer ID included in the request at Step S105 and stores the data in the payment code management information 50c.

The payment communication unit 43b in the computer 40 creates the two-dimensional code such as a QR code (registered trademark) indicative of the payment code replied from the online payment service 50 at Step S106 (Step S107). The payment communication unit 43b makes the payment code replied from the online payment service 50 at Step S106 correspond to the MFP ID and the job ID, which are transmitted from the MFP 30 at Step S103, and the charge calculated at Step S104 and stores the data to the payment code management information 42c.

Next, the payment communication unit 43b transmits the two-dimensional code created at Step S107 to the MFP 30 (Step S108).

Accordingly, the payment code notification unit 38b in the MFP 30 displays the two-dimensional code transmitted from the computer 40 at Step S108 in the display 32 (Step S109).

Next, the following describes the operations of the copy system 10 from when the user terminal 20 reads the two-dimensional code until the MFP 30 terminates copying.

Figure 12:
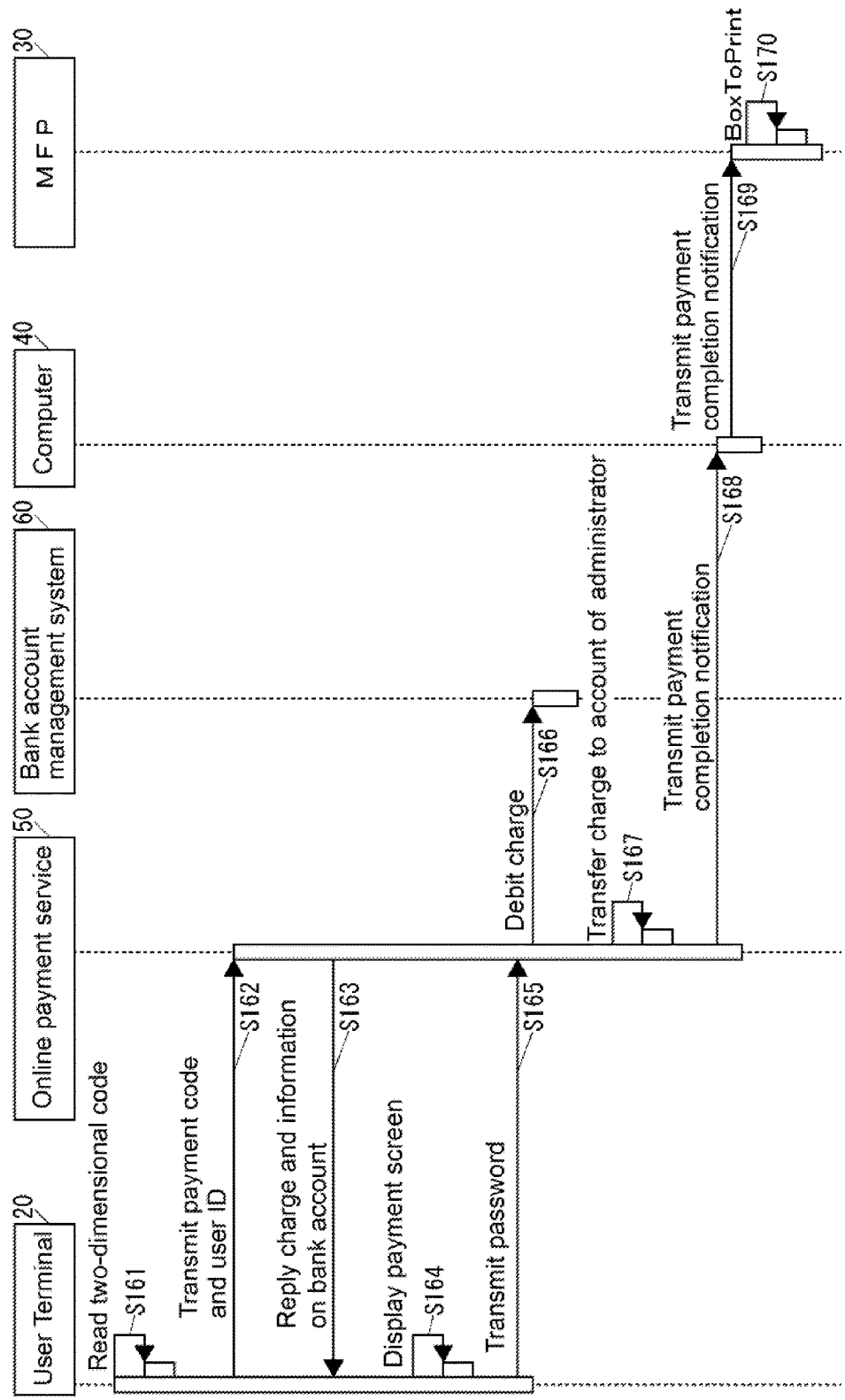
FIG. 12 illustrates a sequence diagram of the copy system according to the first embodiment from when a user terminal reads the two-dimensional code until the MFP terminates copying.

FIG. 12 illustrates the operations of the copy system 10 according to the first embodiment from when the user terminal 20 reads the two-dimensional code until the MFP 30 terminates the copying.

The user can operate the user terminal 20 such that the capturing unit 23 in the user terminal 20 reads the two-dimensional code displayed in the display 32 in the MFP 30 at Step S109. As illustrated in FIG. 12, when the user terminal 20 is operated such that the two-dimensional code displayed in the display 32 is read by the capturing unit 23, the payment instruction unit 26a in the user terminal 20 reads the two-dimensional code displayed in the display 32 by the capturing unit 23 (Step S161).

Next, the payment instruction unit 26a interprets the two-dimensional code read at Step S161 and transmits the payment code and the user ID indicated by this two-dimensional code to the online payment service 50 (Step S162).

Accordingly, the online payment service 50 replies the charge made to correspond to the payment code in the payment code management information 50c and the information on the bank account associated with the user ID in the user bank account information 50a to the user terminal 20 based on the payment code and the user ID transmitted from the user terminal 20 at Step S162 (Step S163).

When the charge and the information on the bank account are transmitted from the online payment service 50, the payment instruction unit 26a in the user terminal 20 displays a payment screen 80 (see FIG. 13) to pay for the charge in the display 22 (Step S164).

Figure 13:
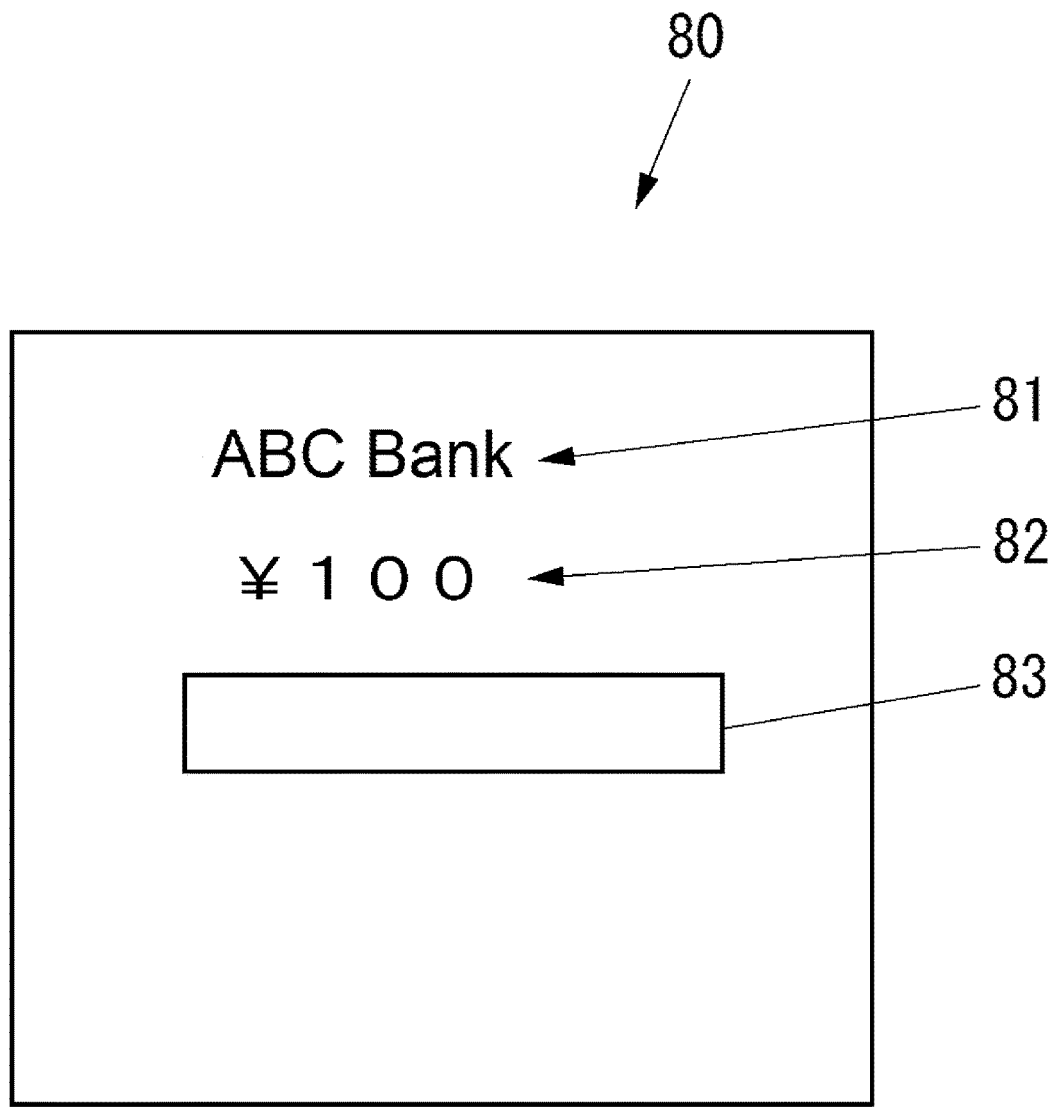
FIG. 13 illustrates a schematic diagram of a payment screen displayed in a display unit of the user terminal according to the first embodiment.

FIG. 13 illustrates one example of the payment screen 80 according to the first embodiment.

As illustrated in FIG. 13, the payment screen 80 includes a text 81, a text 82, and a text box 83. The text 81 shows the information on the bank account transmitted from the online payment service 50. The text 82 shows the charge transmitted from the online payment service 50. To the text box 83, a password for the bank account, that is, a password to permit a debit from the bank account by the bank account management system 60 is input.

FIG. 13 shows a name of a bank as the information on the bank account displayed in the payment screen 80. However, as the information on the bank account, the payment screen 80 may display the information other than the name of the bank in addition to the name of the bank or instead of the name of the bank. At Step S163, it is only necessary that only the information displayed in the payment screen 80 is replied among the information on the bank account.

As illustrated in FIG. 12, when the password for the bank account is input to the text box 83, the payment instruction unit 26a transmits the input password to the online payment service 50 (Step S165).

Accordingly, only when the password transmitted from the user terminal 20 at Step S165 is correct, the online payment service 50 debits the charge made to correspond to the payment code transmitted from the user terminal 20 at Step S162 in the payment code management information 50c from the bank account associated with the user ID transmitted from the user terminal 20 at Step S162 in the user bank account information 50a among the bank accounts managed by the bank account management system 60 (Step S166).

Next, the online payment service 50 transfers the charge debited at Step S166 to the account associated with the administrator ID, which is made to correspond to the payment code transmitted from the user terminal 20 at Step S162 in the payment code management information 50c, in the administrator account information 50b (Step S167). Here, the online payment service 50 makes the user ID transmitted from the user terminal 20 at Step S162 correspond to the payment code transmitted from the user terminal 20 at Step S162 in the payment code management information 50c.

Next, the online payment service 50 transmits a payment completion notification indicative of the completion of the payment for the charge and the payment code transmitted from the user terminal 20 at Step S162 to the computer 40 with the computer ID made to correspond to this payment code in the payment code management information 50c (Step S168).

When the payment completion notification is transmitted from the online payment service 50 at Step S168, the payment communication unit 43b in the computer 40 transmits the payment completion notification to the MFP 30 with the MFP ID made to correspond to this payment code in the payment code management information 42c (Step S169). The payment completion notification shows the completion of the payment for the charge of the job with the job ID made to correspond to the payment code transmitted from the online payment service 50 together with the payment completion notification at Step S168 in the payment code management information 42c.

When the payment completion notification is transmitted from the computer 40 at Step S169, the image printing unit 38c in the MFP 30 executes an "operation of printing the image stored in the specific area in the storage unit 37 by the printer 34" (hereinafter referred to as "BoxToPrint") regarding the image 37b with the image ID made to correspond to the job ID indicated by this payment completion notification in the image management information 37c (Step S170).

As described above, the copy system 10 stores the image created by reading the document by the scanner 33 in the storage unit 37 (Step S101) and prints this image to the recording medium by the printer 34 (Step S170) after the charge is accurately paid based on the result of this reading (Steps S165 to S167). Accordingly, the execution of the copy job of "reading the image from the document by the scanner 33 and printing this image by the printer 34" is not stopped in its course due to an arrearage of the payment for the charge, thereby achieving the improvement in convenience.

The copy system 10 uses the online payment service 50, not the coin box, to pay for the charge. This directly transfers the charge from the bank account of the user of the MFP 30 to the account of the administrator of the MFP 30 and therefore eliminates the need for acquisition work of the charge from the coin box, thereby achieving a reduction in labor costs and safety reception of the charge.

Since the copy system 10 uses the online payment service 50, not the coin box, to pay for the charge, the online payment service 50 can be easily introduced to countries where the coin boxes are not used so much.

Since the copy system 10 rasterizes the image read from the document by the scanner 33 and stores the image in the storage unit 37, the copy system 10 can print the image to the recording medium by the printer 34 without rasterizing the image after the charge is paid. Accordingly, the copy system 10 can terminate the copy job promptly.

The copy system 10 may have a configuration where the copy system 10 stores the image read from the document by the scanner 33 in the storage unit 37 without rasterizing the image and after the charge is accurately paid based on the reading result of the document by the scanner 33, the copy system 10 rasterizes the image stored in the storage unit 37 to print the image to the recording medium by the printer 34.

Since in the copy system 10, the MFP 30 notifies the payment code by the display in the display 32 (Step S109), even if the user terminal 20 and the MFP 30 cannot be communicated with one another, the user terminal 20 can pay the charge via the online payment service 50 using the payment code displayed in the display 32 in the MFP 30.

Since in the copy system 10, the display 32 in the MFP 30 displays the payment code compact as the two-dimensional code, the capturing unit 23 in the user terminal 20 easily captures the payment code, thereby ensuring improving the convenience. The copy system 10 may display the payment code in the display 32 by a method difficult to be captured by the capturing unit 23 in the user terminal 20 compared with the two-dimensional code, such as a character string and a one-dimensional code.

The copy system 10 obtains the payment code displayed in the display 32 by capturing the payment code by the capturing unit 23. This eliminates the need for manual input of the payment code displayed in the display 32 in the MFP 30 by the user of the user terminal 20 to the user terminal 20. Accordingly, the copy system 10 can improve the convenience. When the copy system 10 displays the payment code in the display 32 by a method by which the user of the user terminal 20 is understandable, such as the character string, not the two-dimensional code, the copy system 10 may have a configuration where the user of the user terminal 20 manually inputs the payment code displayed in the display 32 in the MFP 30 to the user terminal 20.

The copy system 10 uses the account managed by the online payment service 50 as the account of the administrator of the MFP 30 according to the embodiment. However, the copy system 10 may have a configuration that uses the bank account as the account of the administrator of the MFP 30, not the account managed by the online payment service 50.

In the embodiment, the copy system 10 uses the bank account as the account of the user of the MFP 30. However, the copy system 10 may have a configuration that uses the account managed by the online payment service 50 as the account of the user of the MFP 30, not the bank account.

The copy system 10 may have a configuration where the execution of the copy program 37a achieves at least a part of the above-described functions of the computer 40 by the MFP 30. For example, the copy system 10 may have a configuration where the MFP 30 achieves the functions equivalent to the charge calculator 43a of the computer 40. When the copy system 10 has a configuration that the MFP 30 achieves all of the above-described functions of the computer 40, the computer 40 may be omitted.

Second Embodiment

The following describes a second embodiment of the disclosure with reference to the drawings.

First, the following describes a configuration of a copy system as a job executing system according to the second embodiment.

Figure 14:
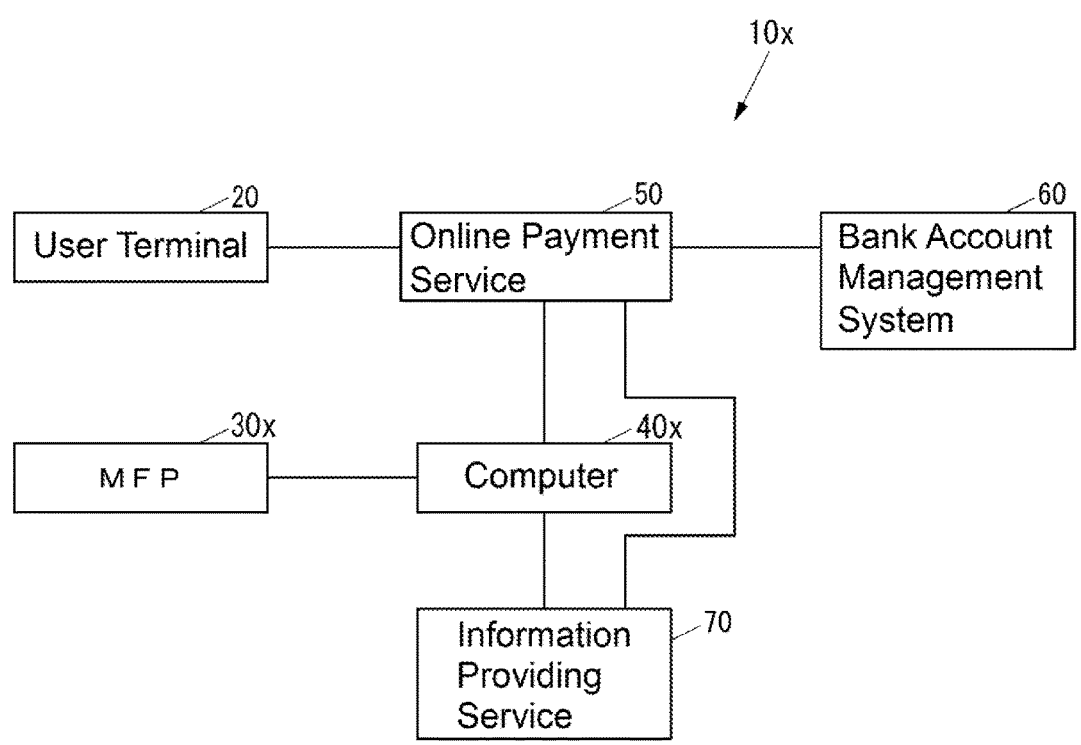
FIG. 14 illustrates a block diagram of a copy system according to a second embodiment of the disclosure.

FIG. 14 illustrates a block diagram of a copy system 10x according to the second embodiment of the disclosure.

As illustrated in FIG. 14, the copy system 10x includes the user terminal 20 used by the user, a multifunction peripheral (an MFP) 30x as an image forming apparatus, a computer 40x, the online payment service 50, which executes the online payment, the bank account management system 60, which manages the bank accounts, and an information providing service 70 as an information providing unit, which provides information on the copy system 10x.

Similar to the online payment service 50 and the bank account management system 60, the information providing service 70 is the cloud service and is the system achieved by the server such as the cloud server.

The computer 40x and the information providing service 70 are communicable via the network such as the Internet.

The online payment service 50 and the information providing service 70 are communicable via the network such as the Internet.

Figure 15:
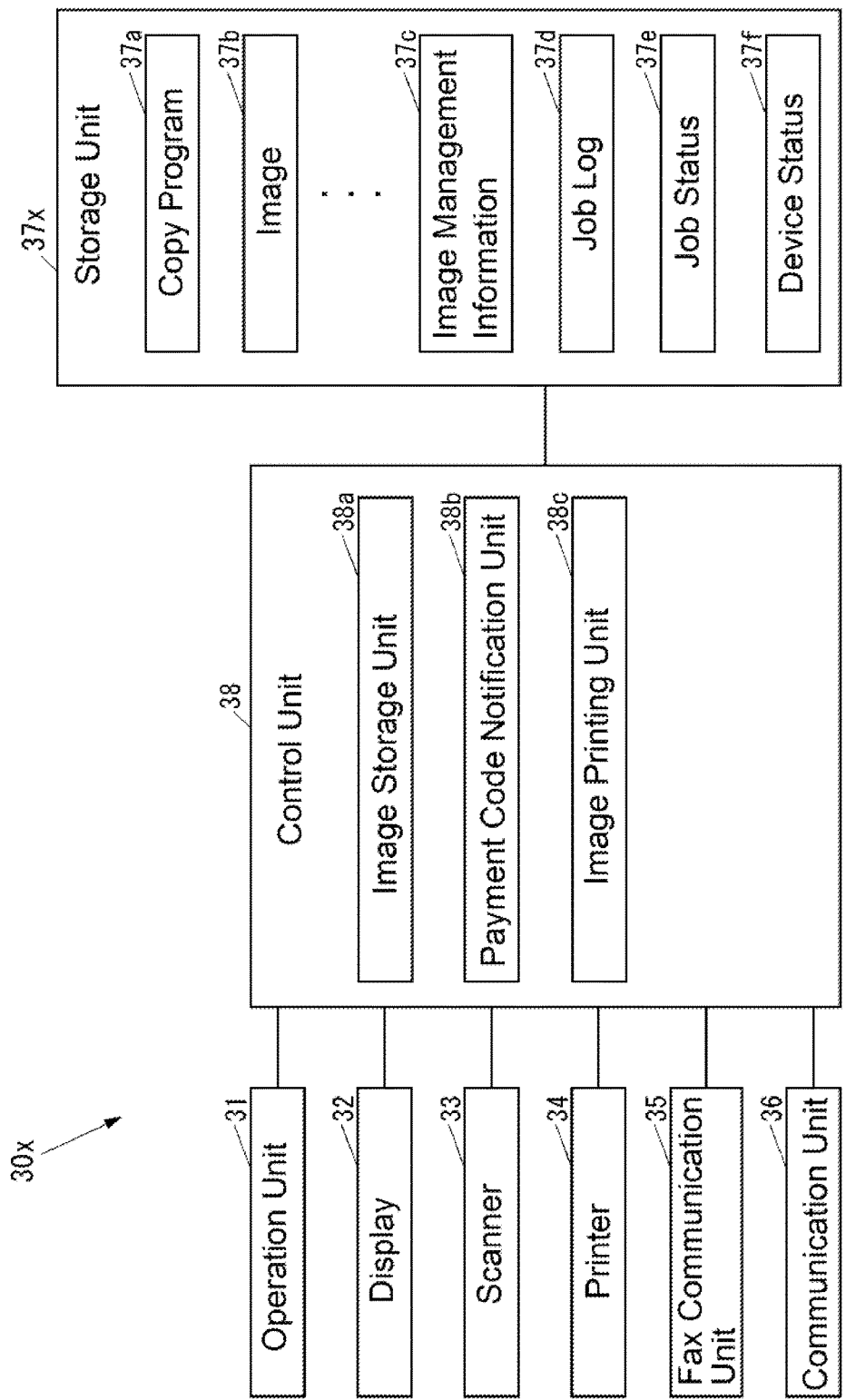
FIG. 15 illustrates a block diagram of an MFP according to the second embodiment.

FIG. 15 illustrates a block diagram of the MFP 30x according to the second embodiment.

As illustrated in FIG. 15, the storage unit 37x can store a job log 37d as a history of the job. The job log 37d shows, for example, a start time and an end time of the job, result information indicative of whether the job has been normally terminated, the number-of-pages information indicative of the number of printed pages, the double-side/single-side information indicative of whether any of the duplex printing and the single-side printing has been executed, the color information indicative of whether any of the monochrome copy and the color copy has been executed, the number-of-copies information indicative of the number of printed copies, and the recording medium size information indicative of the size of the printed recording medium for each job indicated by the job IDs.

The storage unit 37x can store a job status 37e indicative of the status of the copy job such as "during printing of the first sheet," "during printing of the second sheet," and "the job has been terminated." associated with the occurrence times.

The storage unit 37x can store a device status 37f indicative of the status of the MFP such as "jam," "failure," and "empty toner" associated with the occurrence times. The device status 37f is information indicative of an error and a warning of the MFP.

Whenever the respective job log 37d, job status 37e, and device status 37f change, the control unit 38 transmits the changed information to the computer 40x. For example, whenever the job is terminated, the control unit 38 adds the information on the job to the job log 37d and transmits the added information among the job log 37d to the computer 40x.

Figure 16:
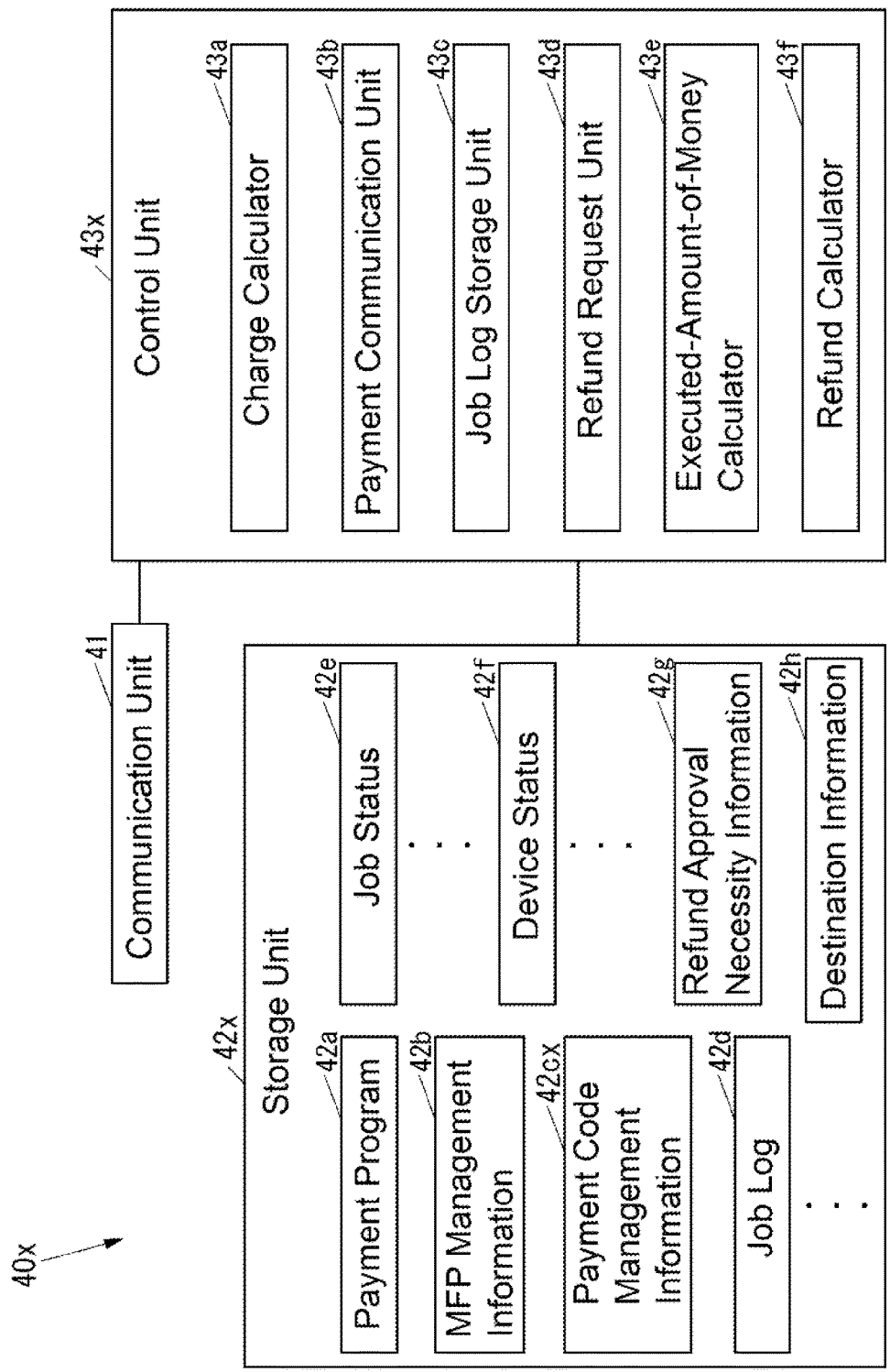
FIG. 16 illustrates a block diagram of a computer according to the second embodiment.

FIG. 16 illustrates a block diagram of the computer 40x according to the second embodiment.

As illustrated in FIG. 16, the computer 40x includes a communication unit 41, a storage unit 42x, and a control unit 43x. The communication unit 41 is a communication device that executes communications with the external device via the network or directly without via the network by the wired or wireless communications. The storage unit 42x is the non-volatile storage device such as the semiconductor memory that stores various pieces of information. The control unit 43 controls the entire computer 40x.

The storage unit 42x stores a payment program 42a for payment by the online payment service 50 (see FIG. 1). The payment program 42a may be installed to the computer 40x at a production stage of the computer 40x, may be additionally installed from an external storage medium such as the USB flash drive, a compact disk (a CD), and a digital versatile disk (a DVD) to the computer 40x, or may be additionally installed from the network to the computer 40x.

The storage unit 42x stores MFP management information 42b to manage the MFP.

FIG. 17 illustrates one example of payment code management information 42cx according to the second embodiment.

As illustrated in FIG. 17, the payment code management information 42cx is information where the payment code, the MFP ID, the job ID, and the charge are made to correspond to.

As illustrated in FIG. 16, a storage unit 42x can store a job log 42d, a job status 42e, and a device status 42f for each MFP.

The storage unit 42x stores refund approval necessity information 42g indicative of whether an approval by a person having a specific authority, namely, the administrator of the MFP is required when the charge is refunded to the user. The refund approval necessity information 42g, for example, can be changed according to an instruction via the communication unit 41. When the computer 40x includes an operation unit, the refund approval necessity information 42g may be changed according to the instruction via this operation unit.

The storage unit 42x stores destination information 42h that can include a plurality of destinations. The destination information 42h includes destinations of persons with various positions such as a destination of the user of the MFP, a destination of the administrator of the MFP, and a destination of the service person of the MFP. In the destination information 42h, the destination of the user of the MFP is made to correspond to the user ID of this user, the destination of the administrator of the MFP is made to correspond to the administrator ID of the administrator, and the destination of the service person of the MFP is made to correspond to a service person ID, identification information of this service person. As the destinations included in the destination information 42h, various destinations such as an e-mail address and a destination for a message function of social networking service (SNS) are applicable.

By executing the payment program 42a, the control unit 43x achieves the charge calculator 43a, the payment communication unit 43b, a job log storage unit 43c, a refund request unit 43d, an executed-amount-of-money calculator 43e, and a refund calculator 43f. The charge calculator 43a calculates the charge based on copy job contents, that is, based on the reading result of the document by the scanner 33 (see FIG. 3). The payment communication unit 43b executes communications for the payment by the online payment service 50 (see FIG. 1). The job log storage unit 43c stores the job log 42d, the job status 42e, and the device status 42f. The refund request unit 43d requests at least a part of the refund of the charge to the online payment service 50. The executed-amount-of-money calculator 43e calculates the amount of money for the already-executed job among the copy jobs based on the job log 42d. The refund calculator 43f subtracts the amount of money for the already-executed job from the charge and calculates the amount of money for refund.

Whenever the MFP transmits the information on the change of any of the job log, the job status, and the device status, the job log storage unit 43c reflects the change to the job log 42d, the job status 42e, and the device status 42f. Whenever the MFP transmits the information on the change of any of the job log, the job status, and the device status, the job log storage unit 43c forwards the information to the information providing service 70. For example, the job log storage unit 43c forwards the addition of the job log 37d transmitted from the MFP whenever the job is terminated to the information providing service 70.

Whenever the addition of the job log 37d is forwarded to the information providing service 70, that is, whenever the MFP terminates the job, the job log storage unit 43c transmits the payment result for the job and device information to the information providing service 70.

Here, the payment result includes the payment code for the job, the sum of the charge for the job, and the breakdown of the charge for the job.

The device information includes the MFP ID of the MFP that has executed the job, an address and a model name of an Internet Protocol (IP), a state of expendables of the MFP while the job was executed, and a device status of the MFP while the job was executed. Here, the device information is information obtained from the target MFP. For example, the "device status of the MFP while the job was executed" is extractable from the device status 42f.

FIG. 18 illustrates one example of payment code management information 50cx according to the second embodiment.

As illustrated in FIG. 18, the payment code management information 50cx is information where the payment codes, the administrator IDs, the user IDs, the charges, and computer IDs, identification information of the computer, are made to correspond to one another.

Figure 19:
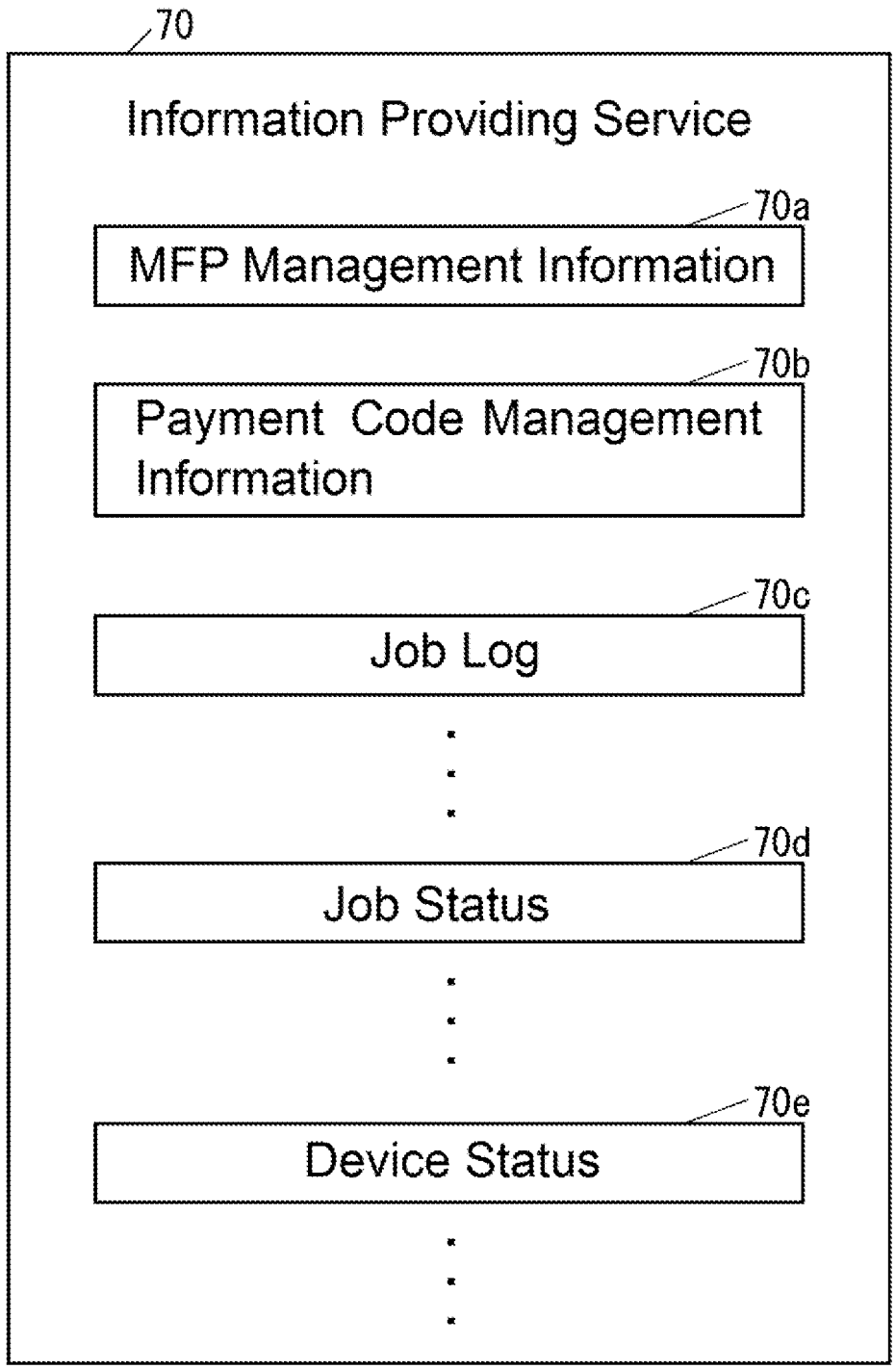
FIG. 19 illustrates a block diagram of information stored by an information providing service according to the second embodiment.

FIG. 19 illustrates one example of information stored by the information providing service 70 according to the second embodiment.

As illustrated in FIG. 19, the information providing service 70 stores MFP management information 70a, payment code management information 70b, a job log 70c, a job status 70d, and a device status 70e, which are identical to the MFP management information 42b (see FIG. 16), the payment code management information 42cx (see FIG. 16), the job log 42d (see FIG. 16), the job status 42e (see FIG. 16), and the device status 42f (see FIG. 16) of the computer 40x (see FIG. 16), respectively.

Whenever the computer 40x transmits the information on the change of any of the job log, the job status, and the device status, the information providing service 70 reflects the change to the job log 70c, the job status 70d, and the device status 70e.

The following describes operations of the computer 40x when a refund process is executed.

Figure 20:
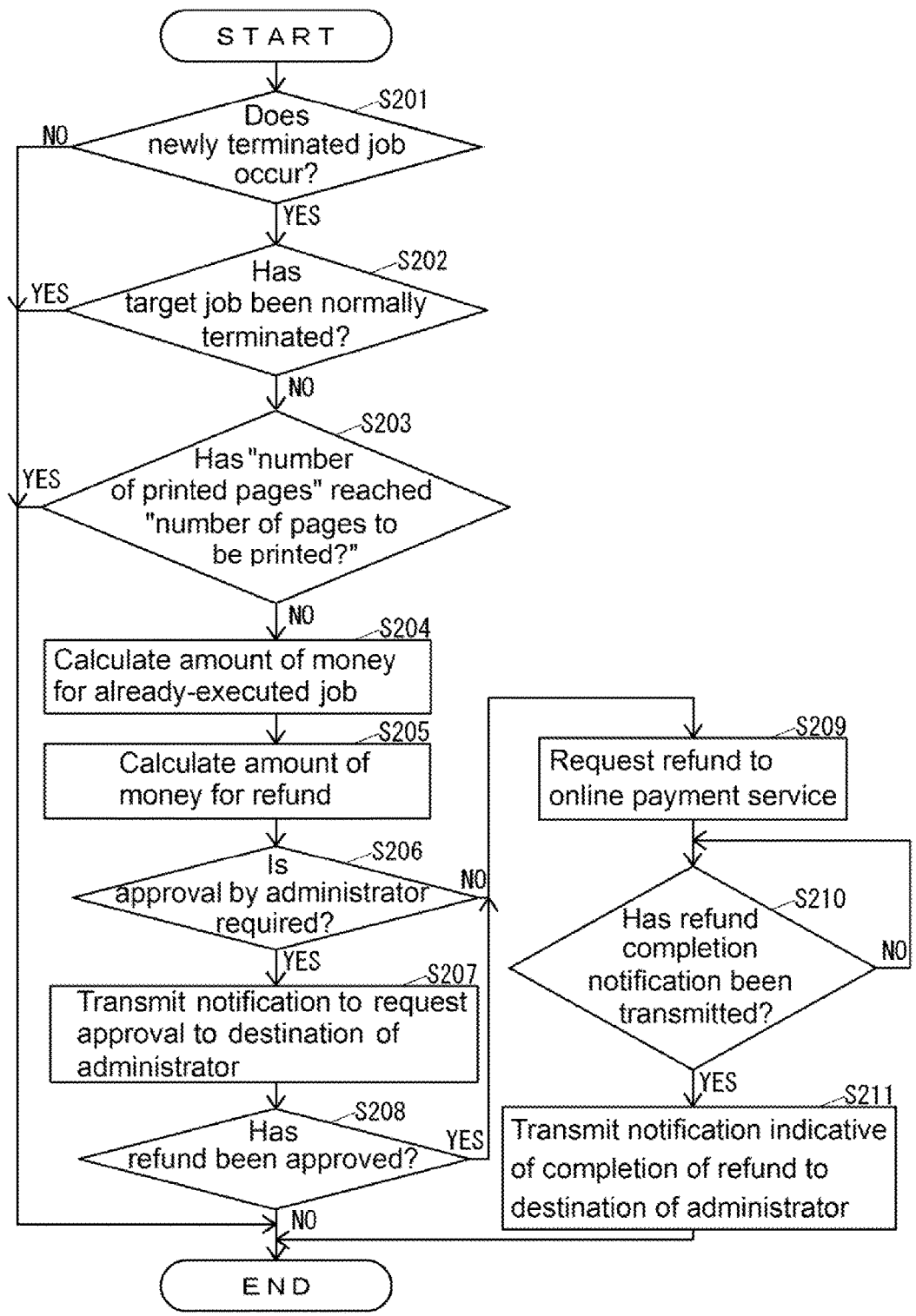
FIG. 20 illustrates a flowchart of the computer according to the second embodiment when a refund process is executed.

FIG. 20 illustrates operations of the computer 40x according to the second embodiment when the refund process is executed.

A control unit 43x in the computer 40x executes the operations illustrated in FIG. 20 whenever the job status 42e changes.

As illustrated in FIG. 20, the refund request unit 43d in the computer 40x determines whether a newly terminated job occurs based on the job status 42e (Step S201). Here, when information on the termination of the job is newly added to the job status 42e, the refund request unit 43d determines that the newly terminated job has occurred.

When the refund request unit 43d determines that the newly terminated job does not occur at Step S201, the control unit 43x terminates the operations illustrated in FIG. 20.

When the refund request unit 43d determines that the newly terminated job (hereinafter referred to as a "target job") has occurred at Step S201, the refund request unit 43d determines whether the target job has been normally terminated based on the job log 42d (Step S202).

When the refund request unit 43d determines that the target job has been normally terminated at Step S202, the control unit 43x terminates the operations illustrated in FIG. 20.

When the refund request unit 43d determines that the target job has not been normally terminated at Step S202, the refund request unit 43d determines whether the "number of printed pages," which is indicated by the number-of-pages information included in the job log 42d, of the target job has reached the "number of pages to be printed," which is indicated by the number-of-pages information included in the attribute used to calculate the charge at Step S104, for the target job (Step S203).

When the refund request unit 43d determines that the "number of printed pages" has reached the "number of pages to be printed" at Step S203, the control unit 43x terminates the operations illustrated in FIG. 20.

When the refund request unit 43d determines that the "number of printed pages" has not reached the "number of pages to be printed" at Step S203, the executed-amount-of-money calculator 43e calculates the amount of money for the already-executed job among the target jobs based on the job log 42d and calculation standard identical to the calculation standard used in the process at Step S104 (Step S204).

Next, the refund calculator 43f subtracts the "amount of money for the already-executed job," which is calculated at Step S204, from the charge for the target job calculated at S104, that is, the charge made to correspond to the job ID of the target job in the payment code management information 42cx to calculate the amount of money for refund (Step S205).

Next, the refund request unit 43d determines whether the approval for refund by the administrator is required based on the refund approval necessity information 42g (Step S206).

When the refund request unit 43d determines that the approval for refund by the administrator is required at Step S206, the refund request unit 43d transmits the notification to request the approval for refund of the target job to a destination made correspond to the administrator ID in the destination information 42h. This administrator ID is made to correspond to the MFP ID made to correspond to the job ID of the target job in the payment code management information 42cx in the MFP management information 42b (Step S207). This notification preferably includes various kinds of information required to approve the refund such as the amount of money to be refunded and the job ID of the target job. The administrator accesses the information providing service 70 using the user terminal 20 and a computer such as a PC (not illustrated) and confirms the device status 70e, the job log 70c, and the job status 70d to ensure determining the necessity for the refund of the target job. Using the user terminal 20 and the computer such as the PC (not illustrated), the administrator can notify whether to approve the refund to the computer 40x via the information providing service 70 or by directly accessing the computer 40x without via the information providing service 70.

After the process at Step S207, the refund request unit 43d determines whether the administrator has approved the refund (Step S208).

When the refund request unit 43d determines that the administrator has not approved the refund at Step S208, the control unit 43x terminates the operations illustrated in FIG. 20.

When the refund request unit 43d determines that the approval for refund by the administrator is not required at Step S206 or determines that the administrator has approved the refund at Step S208, the refund request unit 43d requests the refund by the amount of money calculated at Step S205 to the online payment service 50 (Step S209). Here, the refund request unit 43d transmits the amount of money calculated at Step S205 and the payment code made to correspond to the job ID of the target job in the payment code management information 42cx to the online payment service 50 at Step S209.

Accordingly, the online payment service 50 debits the amount of money by the amount transmitted from the computer 40x at Step S209 from the account associated with the administrator ID, which is made to correspond to the payment code in the payment code management information 50cx transmitted from the computer 40x, in the administrator account information 50b at Step S209. Next, the online payment service 50 transfers the amount of money debited to the bank account associated with the user ID, which is made to correspond to the payment code transmitted from the computer 40x at Step S209 in the payment code management information 50cx, in the user bank account information 50a among the bank accounts managed by the bank account management system 60. The online payment service 50 transmits a refund completion notification indicative of the completion of the refund for charge to the computer 40x.

Until determining that the refund completion notification has been transmitted from the online payment service 50 after the process at Step S209, the refund request unit 43*d* determines whether the refund completion notification has been transmitted from the online payment service 50 (Step S210).

When the refund request unit 43*d* determines that the refund completion notification has been transmitted from the online payment service 50 at Step S210, the refund request unit 43*d* transmits the notification indicative of the completion of the refund for the target job to a destination made correspond to the administrator ID in the destination information 42*h*. This administrator ID is made to correspond to the MFP ID made to correspond to the job ID of the target job in the payment code management information 42*cx* in the MFP management information 42*b* (Step S211). Then, the control unit 43*x* terminates the operations illustrated in FIG. 20. This notification preferably includes various kinds of information regarding the refund such as the amount of money to be refunded, the date and time of the refund, and the job ID of the target job.

Since the copy system 10*x* requests the refund for the job not normally terminated to the online payment service 50 (Step S209), the convenience can be improved.

Since the copy system 10*x* automatically calculates the amount of money to be refunded (Step S205), the convenience can be improved. The copy system 10*x* may have a configuration that the administrator specifies the amount of money to be refunded. The copy system 10*x* may have a configuration that refunds the amount of money other than the "amount of money by the amount subtracting the amount of money for the already-executed job from the charge paid by the user for the job not normally terminated" such as refunding all amount of money for the charge paid by the user for the job not normally terminated.

Since the copy system 10*x* determines the job not normally terminated based on the job log 42*d* (NO at Step S202), when the refund approval necessity information 42*g* shows that the approval for refund by the administrator is required (YES at Step S206), the copy system 10*x* requests the refund for the job not normally terminated to the online payment service 50 at the acquisition of the approval by the administrator (YES at Step S208) (Step S209). This ensures reducing a possibility of causing an error in refund.

When the copy system 10*x* determines the job not normally terminated based on the job log 42*d* (NO at Step S202) and the refund approval necessity information 42*g* shows that the approval for refund by the administrator is required (YES at Step S206), the copy system 10*x* notifies the fact to the specific destination, namely, the destination of the administrator (Step S207). This ensures facilitating the acquisition of the approval by the administrator.

Since the copy system 10*x* allows the administrator to confirm the job status and the device status, the copy system 10*x* allows the user to determine whether the refund should be made before the refund and whether the refund was appropriate after the refund based on the job status and the device status. For example, when the device status of the target job is the "jam," "failure," or "empty toner," in a time slot while the job status is the "during printing," the administrator can determine that the refund should be made for the job before the refund and can determine that the refund was appropriate after the refund. The refund request unit 43*d* in the computer 40*x* may add a condition that the device status has specific contents in a time slot while the job status has specific contents to a condition to specify the job as a candidate for the refund target.

In the embodiment, the copy system 10*x* accepts the approval for refund by the administrator by the computer 40*x*. However, the copy system 10*x* may accept the approval for refund by the administrator by another method. For example, when the copy system 10*x* has a configuration where the information providing service 70 provides a job list of the refund target to each administrator, the copy system 10*x* may have a configuration where the administrator selects the job to be actually refunded from this list to approve the refund for this job by the administrator. When the copy system 10*x* has the configuration where the information providing service 70 causes the administrator to select the job to be actually refunded, the copy system 10*x* may directly request the refund from the information providing service 70 to the online payment service 50 without via the computer 40*x*.

The copy system 10*x* may have a configuration where the execution of the copy program 37*a* achieves at least a part of the above-described functions of the computer 40*x* by the MFP 30*x*. For example, the copy system 10*x* may have a configuration where the MFP 30*x* achieves the functions equivalent to the charge calculator 43*a*, the job log storage unit 43*c*, the refund request unit 43*d*, the executed-amount-of-money calculator 43*e*, and the refund calculator 43*f* of the computer 40*x*. When the copy system 10*x* has a configuration that the MFP 30*x* achieves all of the above-described functions of the computer 40*x*, the computer 40*x* may be omitted.

Third Embodiment

The following describes a third embodiment of the disclosure with reference to the drawings.

Figure 21:
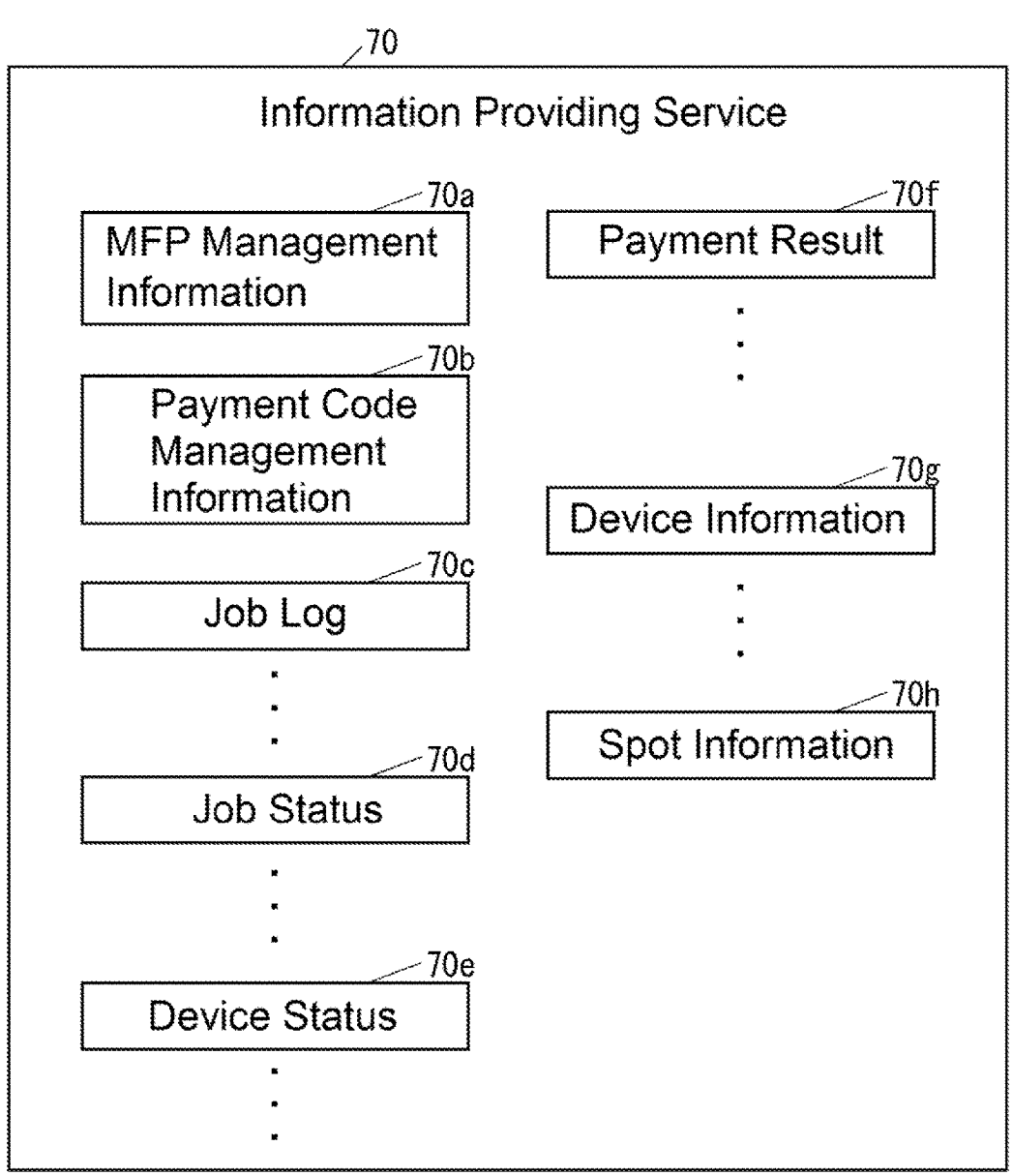
FIG. 21 illustrates a block diagram of information stored by an information providing service according to a third embodiment.

FIG. 21 illustrates one example of information stored by the information providing service 70 according to a third embodiment.

As illustrated in FIG. 21, the information providing service 70 stores the MFP management information 70*a*, the payment code management information 70*b*, the job log 70*c*, the job status 70*d*, and the device status 70*e*, which are identical to the MFP management information 42*b* (see FIG. 16), the payment code management information 42*cx* (see FIG. 16), the job log 42*d* (see FIG. 16), the job status 42*e* (see FIG. 16), and the device status 42*f* (see FIG. 16) of the computer 40*x* (see FIG. 16), respectively.

Whenever the information on a change in any one of the job log, the job status, and the device status is transmitted from the computer 40*x*, the information providing service 70 reflects the change to the job log 70*c*, the job status 70*d*, and the device status 70*e*.

The information providing service 70 stores the payment result and the device information, which are transmitted from the computer 40*x* whenever the MFP terminates the job as a payment result 70*f* and device information 70*g*, respectively, for each job.

The information providing service 70 stores spot information 70*h* indicative of various pieces of information regarding spots where the MFPs usable by the user are provided. The spot information 70*h* includes general information regarding the spots. The general information regarding the spots includes information on a location and business hours of the spot, a kind of the MFP belonging to the spot such as a color machine, a monochrome machine, an A3-size-compatible machine, an A4-size compatible machine, a duplex printing compatible machine, a single-side printing compatible machine, a staple compatible machine, and a punching compatible machine, the number of MFPs, and a unit price used to calculate the charge for the job of using the MFP belonging to the spot. The spot information 70h also includes the MFP ID of the MFP belonging to the spot. The spot information 70h is, for example, editable by an operator of the information providing service 70.

The information providing service 70 can register various pieces of information required to create the information provided to the person such as the user of the MFP, the administrator, and the service person in addition to the above-described information from the outside of the information providing service 70 itself, such as the computer 40x and various services on the Internet. For example, the information such as a reputation of each spot can be registered with the information providing service 70 from a specific site on the Internet.

The following describes operations of the information providing service 70 when the various pieces of information is provided.

Figure 22:
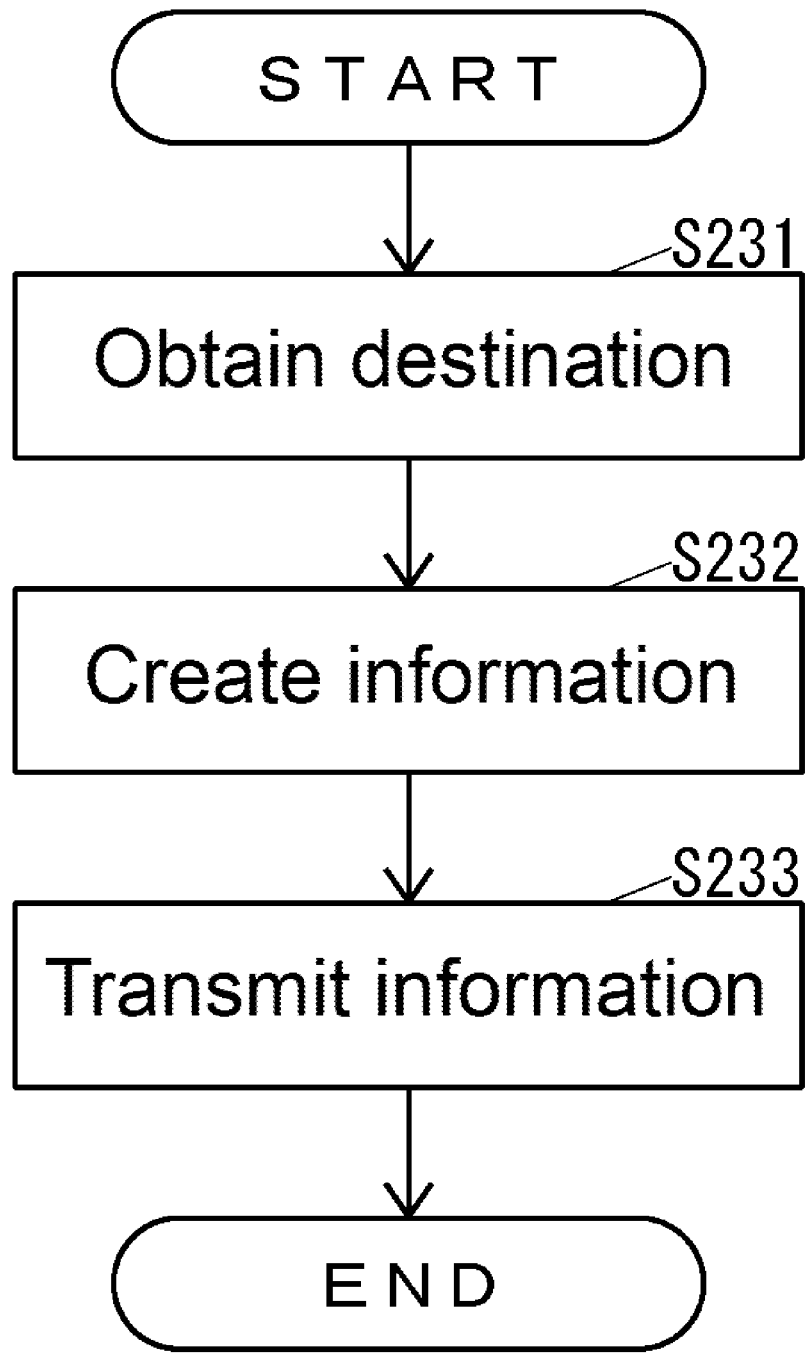
FIG. 22 illustrates a flowchart of the information providing service according to the third embodiment when various pieces of information is provided.

FIG. 22 illustrates the operations of the information providing service 70 when various pieces of information is provided.

As illustrated in FIG. 22, the information providing service 70 obtains a destination of a provider of the information from the destination information 42h (Step S231).

Next, the information providing service 70 creates the information according to the provider from the information managed by the information providing service 70 (Step S232).

Next, the information providing service 70 transmits the information created at Step S232 to the destination obtained at Step S231 (Step S233) and the operations illustrated in FIG. 16 are terminated.

Specifically, the information providing service 70 can transmit, for example, a usage history of the MFP by the person who executes the job, that is, the user of the MFP himself/herself, a payment history for the charge via the online payment service 50 by the user himself/herself, a history of the refund for the charge paid by the user himself/herself, and general information and the reputation regarding the spots close to the location for each user. To transmit the information on the spots close to the location of the user himself/herself to the user, the information providing service 70 requires the registration of the location of the user himself/herself in some cases. The location of the user himself/herself can be obtained by a position acquisition function such as a global positioning system (GPS) function of an electronic device carried by the user such as the user terminal 20 and registered with the information providing service 70.

The information providing service 70, for example, can transmit a usage status of the MFP managed by the administrator of the MFP himself/herself, profit information based on the charge paid via the online payment service 50 to the administrator himself/herself, a history of the refund for the charge of the job using the MFP managed by the administrator himself/herself, a state of expendables of the MFP managed by the administrator himself/herself, the device status of the MFP managed by the administrator himself/herself, and the general information and the reputation regarding the spot where the MFP managed by the administrator himself/herself belongs to for each administrator.

The information providing service 70 can transmit, for example, the state of the expendables of the MFP as a maintenance target by the service person himself/herself, the device status of the MFP as the maintenance target by the service person himself/herself, and the general information regarding the spot where the MFP as the maintenance target by the service person himself/herself belongs to the service person.

The information providing service 70 may provide the information according to the request from the provider of the information and may provide the information at a timing regardless of the request from the provider of the information.

Since the copy system 10x provides the various pieces of information regarding the copy system 10x (Step S233), the convenience can be improved. For example, the user of the MFP can confirm the various pieces of information such as the usage history of the user himself/herself, the payment history of the user himself/herself, the history of the refund of the user himself/herself, and the information regarding the spot closest to the location of the user himself/herself real-time, facilitating using the MFP. The administrator of the MFP can confirm various pieces of information such as the usage status of the MFP managed by the administrator himself/herself, the profit information based on the charge paid via the online payment service 50 to the administrator himself/herself, the history of the refund for the charge of the job using the MFP managed by the administrator himself/herself, the state of expendables of the MFP managed by the administrator himself/herself, the device status of the MFP managed by the administrator himself/herself, and the information regarding the spot where the MFP managed by the administrator himself/herself belongs to real-time. This facilitates the management of the MFP, thereby ensuring, for example, the reduction in the number of persons for management. The service person of the MFP can confirm various pieces of information such as the state of expendables of the MFP as the maintenance target by the service person himself/herself, the device status of the MFP as the maintenance target by the service person himself/herself, and the information regarding the spot where the MFP as the maintenance target by the service person himself/herself belongs to real-time. The service person recognizes, for example, a location of a failure in any of MFPs and a color of insufficient toner in any of MFPs early to ensure repairing the MFP and replenishing the expendables quickly.

Especially, since the copy system 10x provides the unit price of the charge to execute the job, the convenience for the user and the administrator of the MFP can be improved. Since the copy system 10x provides the payment history of the user of the MFP, the convenience for the user can be improved. Since the copy system 10x provides the profit information of the administrator of the MFP, the convenience for the administrator can be improved. Since the copy system 10x provides the history of the refund regarding the charge to execute the job, the convenience for the user and the administrator of the MFP can be improved.

Since the copy system 10x requests the refund for the job that has not been normally terminated to the online payment service 50 (Step S209), the convenience can be improved.

Since the copy system 10x automatically calculates the amount of money to be refunded (Step S205), the convenience can be improved. The copy system 10x may have a configuration that the administrator specifies the amount of money to be refunded. The copy system 10x may have a configuration that refunds the amount of money other than the "amount of money by the amount subtracting the amount of money for the already-executed job from the charge paid by the user for the job not normally terminated" such as refunding all amount of money for the charge paid by the user for the job not normally terminated.

Since the copy system 10x determines the job not normally terminated based on the job log 42d (NO at Step S202), when the refund approval necessity information 42g shows that the approval for refund by the administrator is required (YES at Step S206), the copy system 10x requests the refund for the job not normally terminated to the online payment service 50 at the acquisition of the approval by the administrator (YES at Step S208) (Step S209). This ensures reducing a possibility of causing the error in refund.

When the copy system 10x determines the job not normally terminated based on the job log 42d (NO at Step S202) and the refund approval necessity information 42g shows that the approval for refund by the administrator is required (YES at Step S206), the copy system 10x notifies the fact to the specific destination, namely, the destination of the administrator (Step S207). This ensures facilitating the acquisition of the approval by the administrator.

Since the copy system 10x allows the administrator to confirm the job status and the device status, the copy system 10x allows the user to determine whether the refund should be made before the refund and whether the refund was appropriate after the refund based on the job status and the device status. For example, when the device status of the target job is the "jam," "failure," or "empty toner," in the time slot while the job status is the "during printing," the administrator can determine that the refund should be made for the job before the refund and can determine that the refund was appropriate after the refund. The refund request unit 43d in the computer 40x may add the condition that the device status has specific contents in the time slot while the job status has specific contents to the condition to specify the job as the candidate for the refund target.

In the embodiment, the copy system 10x accepts the approval for refund by the administrator by the computer 40x. However, the copy system 10x may accept the approval for refund by the administrator by another method. For example, the copy system 10x with the configuration of the information providing service 70 providing the job list of the refund target to each administrator, the copy system 10x may have a configuration where the administrator selects the job to be actually refunded from this list to approve the refund for this job by the administrator. The copy system 10x with the configuration where the information providing service 70 causes the administrator to select the job to be actually refunded, the copy system 10x may directly request the refund from the information providing service 70 to the online payment service 50 without via the computer 40x.

The copy system 10x may have a configuration where the execution of the copy program 37a achieves at least a part of the above-described functions of the computer 40x by the MFP 30. For example, the copy system 10x may have a configuration where the MFP 30 achieves the functions equivalent to the charge calculator 43a, the job log storage unit 43c, the refund request unit 43d, the executed-amount-of-money calculator 43e, and the refund calculator 43f of the computer 40x. When the copy system 10x has a configuration that the MFP 30 achieves all of the above-described functions of the computer 40x, the computer 40x may be omitted.

The MFPs 30x include the storage unit 37x such as the HDD usually having a storage capacity overwhelmingly larger than that of the RAM in the control unit 38. Accordingly, by storing the images read from the documents by the scanner 33 in the storage unit 37x (Step S101), the copy system 10x can handle the copy of documents with the massive number of sheets. However, the copy system 10x may store the images read from the documents by the scanner 33 in the RAM in the control unit 38 and print the images stored in the RAM in the control unit 38 to the recording medium by the printer 34 after the charge is accurately paid based on the reading result of the documents by the scanner 33.

While the image forming apparatus of the disclosure is the MFP in the embodiments, the image forming apparatus may be an image forming apparatus other than the MFP such as a copy-only machine.

The job executing system of the disclosure is the copy system that executes the copy job of "reading the image from the document by the scanner 33 and printing this image by the printer 34" in the embodiments. However, the job executing system of the disclosure is also applicable to a system that executes a job other than the copy job among the jobs of "executing the specific process using the image read from the document by the scanner 33" such as the job of a scan transmission of "transmitting the image read from the document by the scanner 33." The job executing system of the disclosure is also applicable to a system that executes a job other than a job of "executing the specific process using the image read from the document by the scanner 33" such as a job of "printing the document stored in the external storage medium such as the USB flash drive and the cloud service by the printer 34." Further, with the job executing system of the disclosure, the job does not need to be executed only by the MFP 30 such as the computer 40x creating print data used by the printer 34 from the document to execute the job of document print of "printing the document by the printer 34" and the computer 40x transmitting the image read from the document by the scanner 33 to execute the job of the scan transmission of "transmitting the image read from the document by the scanner 33." That is, the job executing system of the disclosure is applicable to the system that can execute various kinds of jobs using the MFP 30.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A job executing system comprising:
   an image forming apparatus that includes an image-forming-apparatus control unit, a first display device, and a storage device storing a copy program, wherein by the image-forming-apparatus control unit executing the copy program, the image-forming-apparatus control unit realizes a payment code notification unit and an image printing unit;
   a user terminal that includes a user-terminal control unit, a user-terminal storage unit storing a payment program, a second display device, and an imaging device, wherein by the user-terminal control unit executing the payment program, the user-terminal control unit realizes a payment instruction unit;
   a computer including a computer control unit, and a computer storage unit storing image forming apparatus management information where an image forming apparatus identifier of the image forming apparatus is associated with administrator identifiers of administrators of the image forming apparatus, the computer storage unit further storing a payment program, wherein by the computer control unit executing the payment program, the computer control unit realizes a charge calculator, a payment communication unit, a refund request unit, an executed-amount-of-money calculator, and a refund calculator;

an online payment server storing, on a per user-identifier basis, user bank account information of users of the image forming apparatus, and storing, on a per administrator-identifier basis, administrator account information of the administrators of the image forming apparatus; and a bank account management server that manages bank accounts; wherein in the image forming apparatus (1) the payment code notification unit obtains an attribute of a job executed by the user, and (2) the payment code notification unit transmits a request for a calculation of a charge including the attribute, the image forming apparatus identifier of the image forming apparatus, and a job identifier of the job to the computer;

in the computer (1) the charge calculator calculates the charge for the job based on the attribute and a specific calculation criterion, and (2) the payment communication unit transmits a request for a payment code of the charge including the administrator identifiers and a computer identifier of the computer to the online payment server, the administrator identifiers being associated with the image forming apparatus identifier in the image forming apparatus management information;

the online payment server (1) transmits the created payment code to the computer, and (2) associates the payment code, the charge, the administrator identifiers, and the computer identifier with one another and stores the payment code, the charge, the administrator identifiers, and the computer identifier as first payment code management information;

in the computer (1) the payment communication unit transmits a two-dimensional code as the created payment code to the image forming apparatus, and (2) the payment communication unit associates the payment code, the image forming apparatus identifier, and the job identifier with one another and stores the payment code, the image forming apparatus identifier, and the job identifier as second payment code management information;

the image forming apparatus displays the transmitted two-dimensional code in the first display device;

in the user terminal (1) the payment instruction unit reads the two-dimensional code displayed in the first display device by the image forming apparatus, and (2) the payment instruction unit transmits the payment code shown by the two-dimensional code and a user identifier of the user terminal to the online payment service;

the online payment server transmits the charge associated with the payment code in the first payment code management information and bank account information associated with the user identifier in the user bank account information to the user terminal;

in the user terminal (1) the payment instruction unit displays a payment screen in the second display device for receiving authentication information based on the charge and the bank account information, and (2) the payment instruction unit transmits the authentication information to the online payment server;

the online payment server (1) debits the charge associated with the payment code in the first payment code management information from the bank account associated with the user identifier in the user bank account information managed by the bank account management server only when the authentication information is correct, (2) transfers the charge to an account associated with the administrator identifiers in the administrator account information associated with the payment code in the first payment code management information, and (3) transmits a payment completion notification of the charge and the payment code to the computer with the computer identifier associated with the payment code in the first payment code management information;

when the computer receives the payment completion notification, the payment communication unit transmits the payment completion notification of the charge for the job with the job identifier associated with the payment code in the second payment code management information to the image forming apparatus, the image forming apparatus having the image forming apparatus identifier associated with the payment code in the second payment code management information;

when the image forming apparatus receives the payment completion notification, the image forming apparatus the image printing unit executes the job with the job identifier;

the image-forming-apparatus storage unit stores a job log of the job in the storage device;

in the computer (1) the refund request unit determines whether the job has been normally terminated based on the job log transmitted from the image forming apparatus, (2) the refund request unit determines whether a count of printed pages included in the job log reaches a count of pages to be printed included in the attribute of the job when the refund request unit determines that the job has not been normally terminated, (3) the executed-amount-of-money calculator calculates an amount of money for the already-executed job among the jobs based on the job log and the specific calculation standard when the refund request unit determines that the count of printed pages does not reach the count of pages to be printed, (4) the refund calculator calculates an amount of money to be refunded by subtracting the amount of money for the already-executed job from the charge for the job calculated based on the attribute and the specific calculation standard, and (5) the refund request unit transmits the amount of money to be refunded and the payment code associated with the job identification information in the second payment code management information to the online payment server;

the online payment server (1) debits the amount of money to be refunded from the account associated with the administrator identifiers in the administrator account information, the administrator identifiers being associated with the payment code in the first payment code management information, (2) transfers the amount of money to be refunded to the bank account associated with the user identifier in the user bank account information managed by the bank account management server, and (3) transmits a refund completion notification indicative of a completion of the transfer of the amount of money to be refunded to the computer; and when the computer receives the refund completion notification, the refund request unit transmits the refund completion notification to a destination of the administrator identifiers associated with the image forming apparatus identifier in the image forming apparatus management information, the image forming apparatus identifier being associated with the job identifier in the second payment code management information.

2. The job executing system according to claim 1, wherein:

the image forming apparatus further includes a reading device;

the job executes a specific process using an image read from a document by the reading device; and the image forming apparatus (1) stores the image read from the document by the reading device in the storage device, and (2) executes the specific process using the image stored in the storage device.

3. The job executing system according to claim 2, wherein:

the image forming apparatus further includes a print device; and the specific process is a printing of the image by the print device.

4. The job executing system according to claim 3, wherein the storage device stores the image data that is read from the document by the reading device and rasterized.

5. The job executing system according to claim 1, wherein:

the job executing system further includes an information providing service that provides information on the job executing system; and the information on the job executing system includes at least one of (1) information on a unit price used to calculate the charge by the computer, (2) a payment history of the charge for each of the users of the image forming apparatus, (3) profit information based on the charge paid to each of the administrators of the image forming apparatus, and (4) a history of the amount of money to be refunded for the charge paid by each of the users of the image forming apparatus.

6. The job executing method according to claim 1 further performed by an information providing service that provides job executing information, wherein the job executing information includes at least one of:

(1) information on a unit price used to calculate the charge by the computer;

(2) a payment history of the charge for each of the users of the image forming apparatus;

(3) profit information based on the charge paid to each of the administrators of the image forming apparatus; and (4) a history of the amount of money to be refunded for the charge paid by each of the users of the image forming apparatus.

7. A job executing method performed by an image forming apparatus that includes an image-forming-apparatus control unit, a first display device, and a storage device storing a copy program, wherein by the image-forming-apparatus control unit executing the copy program, the image-forming-apparatus control unit realizes a payment code notification unit and an image printing unit, a user terminal that includes a user-terminal control unit, a user-terminal storage unit storing a payment program, a second display device, and an imaging device, wherein by the user-terminal control unit executing the payment program, the user-terminal control unit realizes a payment instruction unit, a computer including a computer control unit, and a computer storage unit storing image forming apparatus management information where an image forming apparatus identifier of the image forming apparatus is associated with administrator identifiers of administrators of the image forming apparatus, the computer storage unit further storing a payment program, wherein by the computer control unit executing the payment program, the computer control unit realizes a charge calculator, a payment communication unit, a refund request unit, an executed-amount-of-money calculator, and a refund calculator, an online payment server storing, on a per user-identifier basis, user bank account information of users of the image forming apparatus, and storing, on a per administrator-identifier basis, administrator account information of the administrators of the image forming apparatus, and a bank account management server that manages bank accounts;

the method comprising:

via the image forming apparatus (1) obtaining, through the payment code notification unit, an attribute of a job executed by the user, and (2) transmitting, through the payment code notification unit, a request for a calculation of a charge including the attribute, the image forming apparatus identifier of the image forming apparatus, and a job identifier of the job to the computer;

via the computer (1) calculating, in charge calculator, the charge for the job based on the attribute and a specific calculation criterion, and (2) transmitting, through the payment communication unit, a request for a payment code of the charge including the administrator identifiers and a computer identifier of the computer to the online payment server, the administrator identifiers being associated with the image forming apparatus identifier in the image forming apparatus management information;

via the online payment server (1) transmitting the created payment code to the computer, and (2) associating the payment code, the charge, the administrator identifiers, and the computer identifier with one another and stores the payment code, the charge, the administrator identifiers, and the computer identifier as first payment code management information;

via the computer (1) transmitting, through the payment communication unit, a two-dimensional code as the created payment code to the image forming apparatus, and (2) associating, through the payment communication unit, the payment code, the image forming apparatus identifier, and the job identifier with one another and storing the payment code, the image forming apparatus identifier, and the job identifier as second payment code management information;

via the image forming apparatus, displaying the transmitted two-dimensional code in the first display device;

via the user terminal
- (1) reading, through the payment instruction unit, the two-dimensional code displayed in the first display device by the image forming apparatus, and
- (2) transmitting, through the payment instruction unit, the payment code shown by the two-dimensional code and a user identifier of the user terminal to the online payment service;

via the online payment server, transmitting the charge associated with the payment code in the first payment code management information and bank account information associated with the user identifier in the user bank account information to the user terminal;

via the user terminal
- (1) displaying, through the payment instruction unit, a payment screen in the second display device for receiving authentication information based on the charge and the bank account information, and
- (2) transmitting, through the payment instruction unit, the authentication information to the online payment service;

the online payment server
- (1) debiting the charge associated with the payment code in the first payment code management information from the bank account associated with the user identifier in the user bank account information managed by the bank account management server only when the authentication information is correct,
- (2) transferring the charge to an account associated with the administrator identifier in the administrator account information associated with the payment code in the first payment code management information, and
- (3) transmitting a payment completion notification of the charge and the payment code to the computer with the computer identifier associated with the payment code in the first payment code management information;

via the computer, when receiving the payment completion notification, transmitting, through the payment communication unit, the payment completion notification of the charge for the job with the job identifier associated with the payment code in the second payment code management information to the image forming apparatus, the image forming apparatus having the image forming apparatus identifier associated with the payment code in the second payment code management information; and via the image forming apparatus, when receiving the payment completion notification, executing the job with the job identifier; wherein the image-forming-apparatus storage unit stores a job log of the job in the storage device; and the method further comprises via the computer
- (1) determining, in the refund request unit, whether the job has been normally terminated based on the job log transmitted from the image forming apparatus,
- (2) determining, in the refund request unit, whether a count of printed pages included in the job log reaches a count of pages to be printed included in the attribute of the job when the determining in the refund request unit determines that the job has not been normally terminated,
- (3) calculating, in the executed-amount-of-money calculator, an amount of money for the already-executed job among the jobs based on the job log and the specific calculation standard when the determining in the refund request unit determines that the count of printed pages does not reach the count of pages to be printed,
- (4) calculating, in the refund calculator, an amount of money to be refunded by subtracting the amount of money for the already-executed job from the charge for the job calculated based on the attribute and the specific calculation standard, and
- (5) transmitting, through the refund request unit, the amount of money to be refunded and the payment code associated with the job identification information in the second payment code management information to the online payment server;

via the online payment server
- (1) debiting the amount of money to be refunded from the account associated with the administrator identifiers in the administrator account information, the administrator identifier being associated with the payment code in the first payment code management information,
- (2) transferring the amount of money to be refunded to the bank account associated with the user identifier in the user bank account information managed by the bank account management server, and
- (3) transmitting a refund completion notification indicative of a completion of the transfer of the amount of money to be refunded to the computer; and via the computer, on receipt by the computer of the refund completion notification, transmitting, through the refund request unit, the refund completion notification to a destination of the administrator identifiers associated with the image forming apparatus identifier in the image forming apparatus management information, the image forming apparatus identifier being associated with the job identifier in the second payment code management information.

8. The job executing method according to claim 7, wherein:

the image forming apparatus further includes a reading device;

the job executes a specific process using an image read from a document by the reading device; and the method further comprises, via the image forming apparatus
- (1) storing the image read from the document by the reading device in the storage device, and
- (2) executing the specific process using the image stored in the storage device.

9. The job executing method according to claim 8, wherein:

the image forming apparatus further includes a print device; and the specific process is a printing of the image by the print device.

10. The job executing method according to claim 9, wherein the storage device stores the image data that is read from the document by the reading device and rasterized.

* * * * *